United States Patent
Hassanzadeh et al.

(10) Patent No.: US 12,248,601 B2
(45) Date of Patent: Mar. 11, 2025

(54) PRIVACY-PRESERVING MACHINE LEARNING TRAINING BASED ON HOMOMORPHIC ENCRYPTION USING EXECUTABLE FILE PACKAGES IN AN UNTRUSTED ENVIRONMENT

(71) Applicant: Accenture Global Solutions Limited, Dublin (IE)

(72) Inventors: Amin Hassanzadeh, Arlington, VA (US); Neil Hayden Liberman, Arlington, VA (US); Aolin Ding, Piscataway, NJ (US); Malek Ben Salem, Falls Church, VA (US)

(73) Assignee: Accenture Global Solutions Limited, Dublin (IE)

( * ) Notice: Subject to any disclaimer, the term of this patent is extended or adjusted under 35 U.S.C. 154(b) by 421 days.

(21) Appl. No.: 17/383,314

(22) Filed: Jul. 22, 2021

(65) Prior Publication Data
US 2023/0025754 A1    Jan. 26, 2023

(51) Int. Cl.
| G06F 21/62 | (2013.01) |
| G06F 21/60 | (2013.01) |
| G06N 20/00 | (2019.01) |
| H04L 9/00 | (2022.01) |

(52) U.S. Cl.
CPC ........ *G06F 21/6245* (2013.01); *G06F 21/602* (2013.01); *G06N 20/00* (2019.01); *H04L 9/008* (2013.01)

(58) Field of Classification Search
None
See application file for complete search history.

(56) References Cited

U.S. PATENT DOCUMENTS

| 10,931,588 B1 * | 2/2021 | Matthews | H04L 45/66 |
| 11,276,001 B1 * | 3/2022 | Sutherland | A61B 34/35 |
| 11,349,725 B2 * | 5/2022 | Mwanje | H04L 41/145 |

(Continued)

OTHER PUBLICATIONS

Li et al.; HomoPAI: A Secure Collaborative Machine Learning Platform based on Homomorphic Encryption; 2020; Retrieved from the Internet https://ieeexplore.ieee.org/abstract/document/9101628; pp. 1-5, as printed. (Year: 2020).*

*Primary Examiner* — Michael W Chao
(74) *Attorney, Agent, or Firm* — Organization

(57) ABSTRACT

Aspects of the present disclosure provide systems, methods, and computer-readable storage media that support secure training of machine learning (ML) models that preserves privacy in untrusted environments using distributed executable file packages. The executable file packages may include files, libraries, scripts, and the like that enable a cloud service provider configured to provide ML model training based on non-encrypted data to also support homomorphic encryption of data and ML model training with one or more clients, particularly for a diagnosis prediction model trained using medical data. Because the training is based on encrypted client data, private client data such as patient medical data may be used to train the diagnosis prediction model without exposing the client data to the cloud service provider or others. Using homomorphic encryption enables training of the diagnosis prediction model using encrypted data without requiring decryption prior to training.

11 Claims, 7 Drawing Sheets

(56) References Cited

U.S. PATENT DOCUMENTS

| | | | | |
|---|---|---|---|---|
| 11,500,929 B2* | 11/2022 | Choudhury | G06F 16/909 |
| 11,562,270 B2* | 1/2023 | Kaufmann | G06N 5/043 |
| 11,604,965 B2* | 3/2023 | Sun | G06N 3/084 |
| 11,669,780 B2* | 6/2023 | Zhang | G06N 3/086 |
| | | | 706/12 |
| 11,748,337 B2* | 9/2023 | Manamohan | G06F 11/3055 |
| | | | 707/703 |
| 11,954,042 B2* | 4/2024 | Akel | H04L 67/1097 |
| 2013/0268357 A1* | 10/2013 | Heath | G06Q 10/10 |
| | | | 726/26 |
| 2014/0046696 A1* | 2/2014 | Higgins | G16H 50/20 |
| | | | 705/3 |
| 2014/0143332 A1* | 5/2014 | Garg | G06F 16/24578 |
| | | | 709/204 |
| 2017/0024466 A1* | 1/2017 | Bordawekar | G06F 40/56 |
| 2017/0111234 A1* | 4/2017 | Kadav | H04L 41/16 |
| 2017/0351530 A1* | 12/2017 | Gupta | G06F 9/30087 |
| 2018/0018590 A1* | 1/2018 | Szeto | G16H 50/20 |
| 2019/0213346 A1* | 7/2019 | Friedman | G06F 21/6218 |
| 2019/0220703 A1* | 7/2019 | Prakash | G06V 10/95 |
| 2019/0349266 A1* | 11/2019 | Johnsson | H04L 45/02 |
| 2020/0134564 A1* | 4/2020 | Reilly | G06F 9/5005 |
| 2020/0211692 A1* | 7/2020 | Kalafut | G06N 20/00 |
| 2020/0252198 A1* | 8/2020 | Nandakumar | G06N 3/084 |
| 2020/0311300 A1* | 10/2020 | Callcut | G06F 30/20 |
| 2021/0134456 A1* | 5/2021 | Posnack | G16H 80/00 |
| 2021/0357256 A1* | 11/2021 | Cao | G06F 11/3433 |
| 2021/0391987 A1* | 12/2021 | Badrinarayanan | H04L 9/0833 |
| 2022/0067181 A1* | 3/2022 | Carley | G06N 20/00 |
| 2022/0092216 A1* | 3/2022 | Mohassel | G06N 3/084 |
| 2022/0166607 A1* | 5/2022 | Ratha | H04L 9/0822 |
| 2022/0327001 A1* | 10/2022 | Ferreira | G06F 9/4881 |
| 2022/0374814 A1* | 11/2022 | Buchbinder | G06Q 10/063112 |
| 2022/0374904 A1* | 11/2022 | Vaculin | G06N 20/00 |
| 2022/0414464 A1* | 12/2022 | Krishnaswamy | G06N 3/047 |
| 2023/0153686 A1* | 5/2023 | Waller | G06F 21/602 |
| | | | 706/12 |
| 2023/0188319 A1* | 6/2023 | Froelicher | G06N 3/08 |
| | | | 713/189 |

* cited by examiner

PRIVACY-PRESERVING MACHINE LEARNING TRAINING BASED ON HOMOMORPHIC ENCRYPTION USING EXECUTABLE FILE PACKAGES IN AN UNTRUSTED ENVIRONMENT

TECHNICAL FIELD

The present disclosure relates generally to training of machine learning (ML) models using encrypted data that preserves privacy in an untrusted environment. The techniques described herein may leverage third party cloud services to support training of a diagnosis prediction ML model by multiple medical institutions using distributed executable file packages.

BACKGROUND

Machine learning (ML) and artificial intelligence (AI) are increasingly being leveraged in a variety of technologies to efficiently automate the performance of a variety of tasks. For example, computing devices have been configured to utilize ML and AI to forecast time series data, to identify and predict anomalies, to categorize digital images or video, to perform automatic speech recognition, to perform natural language processing, and the like. Coupled with the advance of deep learning (DL), a very noticeable trend is that ML models heavily rely on large-scale datasets and intensive computing resources. When facing distributed networks and highly sensitive datasets (e.g., finance, healthcare, etc.), conventional central-cloud ML infrastructures impose unique challenges due to their centralized system designs. In order to configure ML models, such as neural networks (NNs), the ML models are designed to have an initial structure and are then trained, using training data, to perform a target task. Depending on the size and complexity of the ML model and the target task to be performed, such training can be significantly expensive in terms of computational resources. To support use of ML techniques in less powerful devices, such as some wireless devices (e.g., mobile phones, Internet of Things (IoT) devices, and like), training of ML models may be performed at a computing device with a large amount of computational resources, such as a server or one or more cloud-based processing devices. For example, cloud service providers have begun offering ML functionality in some cloud-computing offerings that enable a user to configure training data, design an ML model, train the ML model using the training data, and host the trained ML model all at processing resources and storage locations in the service provider's cloud.

One popular task performed using ML is forecasting (e.g., prediction). To illustrate, an ML model may be trained to predict a particular state based on input data. For example, an ML model may be trained as a diagnosis prediction model that outputs (e.g., predicts) a diagnosis of a patient based on input medical data. Forecasting ML models are typically "data hungry" in that the ML models benefit from being trained using substantially large data sets. Such large data sets may not be available to smaller medical institutions, such as a county hospital, a single doctor's office, a specialist's office, or the like. Thus, a diagnosis prediction ML model that is trained on data sets of multiple different medical institutions may have improved accuracy as compared to an ML model trained based on a data set of a single medical institution. Cloud service providers that offer ML functionality may be able to provide such an improved fraud detection model by collecting the data of multiple clients to use in training a global ML model, if the clients are willing to share such data.

Although offloading the training and hosting of ML models from clients reduces the amount of computing resources required by the client to develop and use ML technology, such offloading sacrifices the privacy of the data used in the training process. In such cases, the entity that designs and creates an ML model (e.g., the cloud service provider) requires training data to train the ML model. If the training data is based on confidential or private information of a client, the client may not be willing to share such data with the entity, especially if there are laws or regulations related to data protection. To illustrate, the government and industry organizations have established a multitude of rules and regulations for medical institutions regarding privacy of patients' medical data. For at least these reasons, medical institutions may be unwilling or prohibited from sharing their patients' medical data with cloud service providers to be used as training data for ML models. Although the medical data can be encrypted, such as using public key-private key encryption schemes, most ML functionality offered by cloud service providers is not configured to operate with encrypted data, nor are some medical institutions set up with sufficient computing resources and data scientists or other trained personnel to implement a data encryption scheme with a cloud service provider.

SUMMARY

Aspects of the present disclosure provide systems, methods, apparatus, and computer-readable storage media that support training of machine learning (ML) models that preserves privacy in untrusted environments using distributed executable file packages. To illustrate, executable file packages may be distributed to a server of a cloud services provider and to one or more clients that agree to participate in training of an ML model. The executable file packages may include configuration files, homomorphic encryption (HE) libraries, ML libraries, pre-processing libraries, operating systems, scripts, other files, and the like that enable secure ML model training by a client and a server that is otherwise configured for ML model training of encrypted client data. The secure ML model training may be used to train a diagnosis prediction model for outputting a diagnosis based on client-specific medical data, such as patient data, that is unable to be decrypted by the server or an intercepting party. Because medical data and patient data may be private and confidential to the various clients (e.g., medical institutions), based on customer preferences, business or government regulations, or the like, medical institutions may not be willing to share client data with a cloud service and ML provider for use in training a diagnosis prediction model. In order to train a diagnosis prediction model while maintaining data privacy from the server, the executable file packages may cause the server and client to perform coordinated and secure learning that includes the server receiving encrypted client data from the client for use in training a diagnosis prediction model. Homomorphic encryption is configured such that operations performed on encrypted data generate encrypted results that, when decrypted, match the results generated by performing the same operations on corresponding non-encrypted data. By using homomorphic encryption to encrypt the client data, a diagnosis prediction model may be trained by the server without the server decrypting the client data. The encryption and training techniques may be extended to training a global diagnosis prediction model based on encrypted training data from multiple clients to construct a more robust or accurate diagnosis prediction model than an individual diagnosis prediction model trained using training data from a single client. Additionally, because the training is initiated and controlled by the various executable file packages, client participation in the training may be mostly, or entirely, automated.

To illustrate, execution of an executable file package by a server may cause a server to receive, from one or more client devices, encrypted data and a public key. The executable file package may include a configuration file, ML libraries, HE libraries, and the like to support homomorphic encryption of data and training and execution of ML models. In some implementations, the executable file package may include a Docker container. The encrypted data may include or correspond to encrypted client data from each of the one or more client devices. For example, each of the one or more client devices may execute an executable file package to cause the client devices to encrypt client data for communication to the server. The server may aggregate the encrypted client data to train an aggregated ML model to be used as a global diagnosis prediction model, such as for the one or more clients that participate in the training and, optionally, for other clients that participate in the prediction (e.g., inference) services provided using the global diagnosis prediction model. In some implementations, the aggregation may include weighting the various encrypted client data based on factors related to the clients, as further described herein. The server may deploy the diagnosis prediction model, such as providing the diagnosis prediction model to the client devices or implementing the diagnosis prediction model at an endpoint node for providing diagnosis prediction services. In some implementations, the diagnosis prediction model parameter set may be encrypted using a common public key (e.g., a threshold key) prior to providing the encrypted diagnosis prediction model parameter set to the client devices in addition to a respective secret key, and, if more than a threshold number of client devices participate in partially decrypting the encrypted diagnosis model parameter set using respective secret keys, the encrypted diagnosis model parameter set may be decrypted and aggregated by the server.

In a particular aspect, a method for training machine learning models based on encrypted data using distributed executable file packages includes, based on execution, by one or more processors, of an executable file package stored at a memory, receiving, by the one or more processors from each of one or more client devices, encrypted data and a public key. The executable file package includes one or more configuration files, one or more ML libraries, and one or more HE libraries. For each client device of the one or more client devices, the encrypted data is homomorphically encrypted by the client device based on the public key. The method also includes aggregating, by the one or more processors, the encrypted data associated with each of the one or more client devices to generate aggregated data. The method includes constructing, by the one or more processors, an ML model based on the aggregated data, the ML model configured to output a predicted diagnosis based on input data. The method further includes initiating, by the one or more processors, deployment of the ML model to at least one of the one or more client devices, an endpoint node, or a combination thereof.

In another particular aspect, a system for training machine learning models based on encrypted data using distributed executable file packages includes a memory and one or more processors communicatively coupled to the memory. The memory is configured to store an executable file package. The executable file package includes one or more configuration files, one or more ML libraries, and one or more HE libraries. The one or more processors are configured to execute the executable file package to receive, from each of one or more client devices, encrypted data and a public key. For each client device of the one or more client devices, the encrypted data is homomorphically encrypted based on the public key. The one or more processors are also configured to execute the executable file package to aggregate the encrypted data associated with each of the one or more client devices to generate aggregated data. The one or more processors are configured to execute the executable file package to construct an ML model based on the aggregated data, the ML model configured to output a predicted diagnosis based on input data. The one or more processors are further configured to execute the executable file package to initiate deployment of the ML model to at least one of the one or more client devices, an endpoint node, or a combination thereof.

In another particular aspect, a non-transitory computer-readable storage medium stores instructions that, when executed by one or more processors, cause the one or more processors to perform operations for training machine learning models based on encrypted data using distributed executable file packages. The operations include executing an executable file package stored at a memory to receive, from each of one or more client devices, encrypted data and a public key. The executable file package includes one or more configuration files, one or more ML libraries, and one or more HE libraries. For each client device of the one or more client devices, the encrypted data is homomorphically encrypted by the client device based on the public key. The operations also include aggregating the encrypted data associated with each of the one or more client devices to generate aggregated data. The operations include constructing an ML model based on the aggregated data, the ML model configured to output a predicted diagnosis based on input data. The operations further include initiating deployment of the ML model to at least one of the one or more client devices, an endpoint node, or a combination thereof.

In another particular aspect, a method for training machine learning models based on encrypted data using distributed executable file packages includes, based on execution, by one or more processors, of an executable file package stored at a memory, generating, by the one or more processors, a public key and a private key based on the one or more HE libraries. The executable file package includes one or more configuration files and one or more HE libraries. The method also includes providing, by the one or more processors, the public key to a server. The method includes homomorphically encrypting, by the one or more processors, client data stored at the memory based on the public key to generate encrypted data. The method further includes providing, by the one or more processors, the encrypted data to a server to cause the server to train an ML model to output a predicted diagnosis.

In another particular aspect, a device for training machine learning models based on encrypted data using distributed executable file packages includes a memory and one or more processors communicatively coupled to the memory. The memory is configured to store client data and an executable file package. The executable file package includes one or more configuration files and one or more HE libraries. The one or more processors are configured to execute the executable file package to generate a public key and a private key based on the one or more HE libraries. The one or more processors are also configured to execute the executable file package to provide the public key to a server. The one or more processors are configured to execute the executable file package to homomorphically encrypt the client data based on the public key to generate encrypted data. The one or more processors are further configured to execute the executable file package to provide the encrypted data to the server to cause the server to train an ML model to output a predicted diagnosis.

In another particular aspect, a non-transitory computer-readable storage medium stores instructions that, when executed by one or more processors, cause the one or more processors to perform operations for training machine learning models based on encrypted data using distributed executable file packages. The operations include executing an executable file package stored at a memory to generate a public key and a private key based on one or more HE libraries. The executable file package includes one or more configuration files and the one or more HE libraries. The operations also include providing the public key to a server. The operations include homomorphically encrypting client data stored at the memory based on the public key to generate encrypted data. The operations further include providing the encrypted data to a server to cause the server to train an ML model to output a predicted diagnosis.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support secure training of machine learning (ML) models that preserve privacy in untrusted environments using distributed executable file packages. To illustrate, executable file packages may be distributed to a server of a cloud services provider and to one or more clients that agree to participate in training of an ML model. The executable file packages may include configuration files, homomorphic encryption (HE) libraries, ML libraries, pre-processing libraries, operating systems, scripts, other files, and the like that enable homomorphic encryption of data for ML model training controlled by a server that is otherwise configured for non-secure (e.g., based on non-encrypted data) client-specific ML model training. The secure ML model training may be used to train a diagnosis prediction model that predicts a diagnosis based on client-specific medical data of a patent. Because medical data may be private and confidential to the various clients (e.g., medical institutions), based on customer preferences, business or government regulations, or the like, medical institutions may not be willing to share client data for use in training a client-specific diagnosis prediction model or a global diagnosis prediction model. In order to train a diagnosis prediction model using client data while maintaining data privacy, the executable file packages may cause clients to share encrypted client data, and the server to aggregate the encrypted client data to train a diagnosis prediction model. Because the client data is encrypted before being shared with the server, privacy of the client data is maintained. By using homomorphic encryption, an ML model may be trained based on encrypted client data without having to decrypt the client data at the server for use in training. Additionally, because the training is initiated and controlled by the various executable file packages, client participation in the training may be mostly, or entirely, automated.

Figure 1:
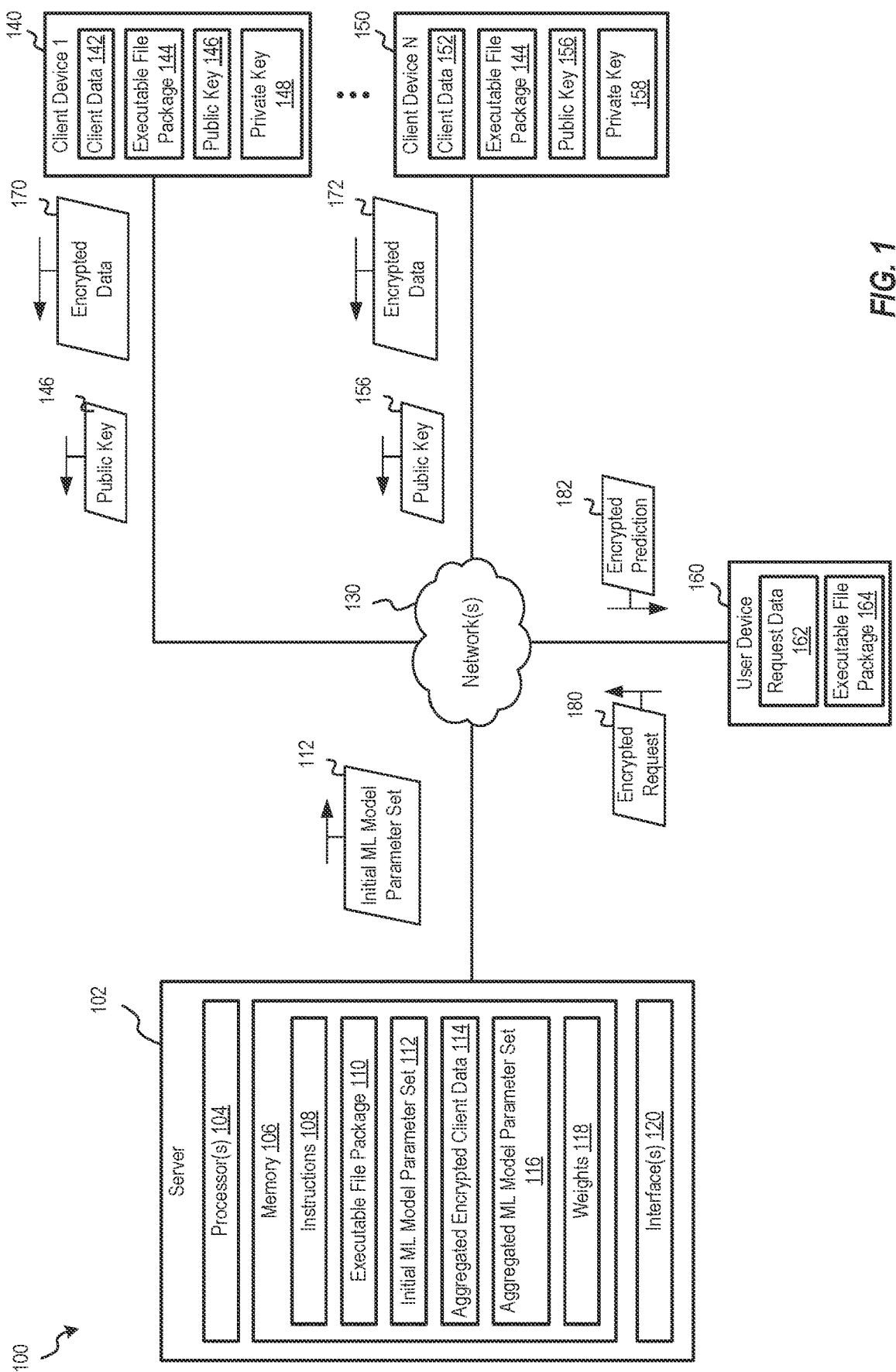
FIG. 1 is a block diagram of an example of a system that supports training machine learning (ML) models based on encrypted data using distributed executable file packages according to one or more aspects.

Referring to FIG. 1, an example of a system that supports training of ML models based on encrypted data using distributed executable file packages according to one or more aspects is shown as a system 100. The system 100 may be configured to enable training ML model(s) by a server and one or more clients in a manner that maintains data privacy for the clients, such as by training the ML model(s) based on data that is encrypted according to an HE scheme defined by executable file packages that are distributed to the server and the one or more clients. The executable file packages may leverage third party ML functionality provided by the server that is not configured for use with encrypted data to improve the security and enhance privacy for the clients. As shown in FIG. 1, the system 100 includes a server 102, a first client device 140, an Nth client device 150, a user device 160, and one or more networks 130. In some implementations, one or more of the first client device 140, the Nth client device 150, or the user device 160 may be optional, or the system 100 may include additional components, such as additional client devices or additional user devices, as a non-limiting example. To further illustrate, the techniques described with reference to the system 100 of FIG. 1 may be performed for a system that includes a single client device (e.g., to train a client-specific ML model) or multiple client devices (e.g., to train a global ML model).

The server 102 is configured to train and deploy ML models in a distributed environment, such as a cloud-based system, as further described herein. In other implementations, the operations described with reference to the server 102 may be performed by a desktop computing device, a laptop computing device, a personal computing device, a tablet computing device, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The server 102 includes one or more processors 104, a memory 106, and one or more communication interfaces 120. It is noted that functionalities described with reference to the server 102 are provided for purposes of illustration, rather than by way of limitation and that the exemplary functionalities described herein may be provided via other types of computing resource deployments. For example, in some implementations, computing resources and functionality described in connection with the server 102 may be provided in a distributed system using multiple servers or other computing devices, or in a cloud-based system using computing resources and functionality provided by a cloud-based environment that is accessible over a network, such as the one of the one or more networks 130. To illustrate, one or more operations described herein with reference to the server 102 may be performed by one or more servers or a cloud-based system that communicates with one or more client or user devices, cloud-based systems of one or more clients or users, or a combination thereof. As a non-limiting example, the server 102 may be a server included in a cloud maintained by a cloud service provider, and one or more elements described herein as being stored at or retrieved from the server 102 may instead be stored at or retrieved from one or more other cloud storage locations maintained by the cloud service provider.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the server 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the server 102 may be stored in the memory 106 as instructions 108 that, when executed by the one or more processors 104, cause the one or more processors 104 to perform the operations described herein with respect to the server 102, as described in more detail below. Additionally, the memory 106 may be configured to store data and information, such as an executable file package 110, an initial ML model parameter set 112, aggregated encrypted client data 114, and weights 118. Illustrative aspects of the executable file package 110, the initial ML model parameter set 112, the aggregated encrypted client data 114, and the weights 118 are described in more detail below.

The one or more communication interfaces 120 may be configured to communicatively couple the server 102 to the one or more networks 130 via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, and the like). In some implementations, the server 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the server 102. In some implementations, the server 102 is coupled to the display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the server 102.

The first client device 140 and the Nth client device 150 are configured to communicate with the server 102 via the one or more networks 130 to train one or more ML models. The client devices 140 and 150 may include computing devices, such as desktop computing devices, servers, laptop computing devices, personal computing devices, tablet computing devices, mobile devices (e.g., smart phones, tablets, PDAs, wearable devices, and the like), VR devices, AR devices, XR devices, vehicles (or component(s) thereof), entertainment systems, other computing devices, or a combination thereof, as non-limiting examples. Each of the client devices 140 and 150 may include a respective processor and a respective memory that stores instructions that, when executed by the processor, cause the processors to perform the operations described herein, similar to the server 102. The client devices 140 and 150 may also store client-specific data, which may be private or confidential to the respective client, and executable file packages received from the cloud service provider or another entity. To illustrate, the first client device 140 may store first client data 142 that is specific to a first client and an executable file package 144, and the Nth client device 150 may store Nth client data 152 that is specific to an Nth client and the executable file package 144. As further described herein, each client device may receive the same (or substantially similar) executable file package from the cloud service provider or another entity. Additionally, as described further herein, the client devices 140 and 150 may be configured to generate and store respective public-private key pairs. For example, the first client device 140 may generate and store a first public key 146 and a first private key 148 that corresponds to the first public key 146. Similarly, the Nth client device 150 may generate and store an Nth public key 156 and an Nth private key 158 that corresponds to the Nth public key 156.

The client devices 140 and 150 may be owned, operated by, or otherwise associated with different clients of an entity associated with the server 102. For example, the server 102 may be included in a cloud or cloud-based system offered by a cloud service-provider and may provide ML and AI-based technology and products to various entities to perform certain tasks, the first client device 140 ("Client Device 1") may be associated with a first client (e.g., a first organization or entity), and the Nth client device 150 ("Client Device N") may be associated with a second client (e.g., a second organization or entity) that is different from the first client. Although two client devices 140 and 150 are depicted in FIG. 1, in other implementations, the system 100 may include more than two client devices that are associated with more than two distinct clients (e.g., there may be N client devices, and N may be any integer greater than or equal to two). The various clients may be in the same industry, or related industries. For example, the clients may include different medical institutions, such as hospitals, doctors' offices, medical groups, specialists' offices, emergency rooms, surgery centers, urgent care clinics, outpatient clinics, dentists, psychiatrists, psychologists, therapists, or the like.

The user device 160 is configured to communicate with the server 102 (or an endpoint node in the cloud that is managed by the server 102) via the one or more networks 130 to receive the service provided by the trained ML model(s). The user device 160 may include a computing device, such as a desktop computing device, a server, a laptop computing device, a personal computing device, a tablet computing device, a mobile devices (e.g., a smart phone, a tablet, a PDA, a wearable device, and the like), a VR device, an AR device, an XR device, a vehicle (or component(s) thereof), an entertainment system, another computing device, or a combination thereof, as non-limiting examples. The user device 160 may include a processor and a memory that stores instructions that, when executed by the processor, cause the processors to perform the operations described herein, similar to the server 102. The user device 160 may also store or have access to client-specific data, which may be private or confidential to the respective client, and an executable file package received from the cloud service provider. To illustrate, the user device 160 may store request data 162 that is based on client-specific data and an executable file package 164. As further described herein, each user device may receive the same (or substantially similar) executable file package from the cloud service provider or another entity. In some implementations, the user device 160 may be associated with one of the clients participating in the ML model training. For example, the user device 160 may include or correspond to the first client device 140 or the Nth client device 150. Alternatively, the user device 160 may be associated with a different client of the cloud service provider that subscribes to the ML and AI services provided by the cloud service provider but does not participate in the ML model training.

Due to laws, regulations, customer preferences, or business practices, clients may desire to keep some or all client-specific data private from cloud service providers. Additionally, because the various clients may be competitors, or potential competitors, each client may desire to keep some or all client-specific data private from other clients in scenarios in which a global ML model is to be trained. For at least these reasons, the system 100 may represent an untrusted environment. However, the clients may not be equipped with the technology or people needed to train an ML model for predicting based on their data. To preserve privacy, the present disclosure provides techniques for training and use of ML models by the server 102, the first client device 140, the Nth client device 150, and the user device 160 that include homomorphic encryption of client-specific data, which may be needed as training data or input data. Homomorphic encryption includes encryption schemes in which mathematical operations, such as addition, multiplication, and the like can be performed on encrypted data and the results be meaningful in the original domain of the data after decrypting the results. For example, an ML model may be trained based on encrypted training data, and the ML model may receive encrypted input data and output an encrypted result. Decryption of the encrypted result generates a result that is relevant to the input data (prior to encryption). To illustrate, medical data may be encrypted and provided to a trained ML model as input data, and the trained ML model may output an encrypted prediction that, when decrypted, represents a predicted diagnosis that is based on the medical data. In some other implementations, the techniques of the present disclosure may be extended to training ML models without sharing client-specific data, such as in federated learning systems.

During operation of the system 100, the various clients may subscribe to services provided by the cloud service provider, such as computing, storage, and ML and AI services. The server 102 may be configured to offer individual, service provider-side ML design and training operations to one or more clients. In some implementations, the cloud service provider may provide a multitude of cloud-based services to a variety of clients, including configurable ML design and training services at the server 102. As a specific, non-limiting example, the cloud service provider may be Amazon, and the ML services may include Amazon SageMaker® (Amazon SageMaker is a registered trademark of Amazon Technologies, Inc. of Seattle, Washington). The cloud service provider, or a third party that provides secure ML training services using external cloud resources, may distribute executable file packages to the various entities to support secure ML training via the server 102. For example, the executable file package 110 may be distributed to the server 102, copies of the executable file package 144 may be distributed to the first client device 140 and the Nth client device 150, and the executable file package 164 may be distributed to the user device 160.

In some implementations, each type of entity may receive a different executable file package. For example, the executable file package 110 may be a service provider-side executable file package, the executable file package 144 may be a client-side executable file package, and the executable file package 164 may be a user-side executable file package. Although described as having different executable file packages for clients and users, in other implementations, there may be a single client-side executable file package for all clients and users. In some alternate implementations, there is one common executable file package that includes information for all devices, and different devices may perform different operations based on execution of the executable file package. For example, the executable file package 110, the executable file package 144, and the executable file package 164 may be the same executable file package, and execution of the respective executable file packages may cause the server 102, the client devices 140 and 150, and the user device 160 to perform at least some different operations.

The executable file packages 110, 144, and 164 may include various types of executable files, non-executable files, artifacts, scripts, libraries, and other data, and when installed on the respective devices, enable the devices to join and participate in a collaborative ML service without requiring that the devices support, or that the devices be operated by users with sufficient knowledge to perform complex encryption algorithms, ML model aggregation, and communication functions such as model updates. To illustrate, the executable file packages 110, 144, and 164 may include operating systems (e.g., Linux-based or others), scripting libraries (e.g., Python or the like), ML libraries, homomorphic encryption (HE) libraries, configuration files, and executable files or applications for performing machine learning, data preprocessing, homomorphic encryption, and communications between various clouds or devices. To further illustrate, the ML libraries, executable files, and applications may cause a device to train an ML model, or a partial ML model, to participate in training of an ML model (or a partial ML model) with another device, to aggregate ML models, perform other ML-related operations, or a combination thereof. The configuration files may denote where particular data is to be stored, access privileges associated with storage locations, features to be included in training data, formatting, and the like. The HE libraries, executable files, and applications may cause a device to encrypt data according to an HE scheme prior to sharing the encrypted data with another device or providing the encrypted data as training data to an ML model. The preprocessing files and applications may cause a device to determine whether preprocessing on training or input data is to be performed and to perform the preprocessing if so determined. The communication files or applications may cause a device to communicate data to another device, such as in accordance with one or more formatting requirements, one or more application program interfaces (APIs), one or more cloud communication criteria, one or more command line interfaces (CLIs), or the like. In some implementations, the executable file packages 110, 144, and 164 may include or correspond to Docker containers. In other implementations, the executable file packages 110, 144, and 164 may include or correspond to other types of executable file packages.

After the executable file packages 110, 144, and 164 have been distributed to the server 102, the client devices 140 and 150, and the user device 160, the server 102 may initiate training of an ML model. In some implementations, the ML model may include or correspond to one or more neural networks (NNs), such as multi-layer perceptron (MLP) networks, convolutional neural networks (CNNs), recurrent neural networks (RNNs), deep neural networks (DNNs), long short-term memory (LSTM) NNs. In other implementations, the ML model may be implemented as one or more other types of ML models, such as support vector machines (SVMs), decision trees, random forests, regression models, Bayesian networks (BNs), dynamic Bayesian networks (DBNs), naive Bayes (NB) models, Gaussian processes, hidden Markov models (HMMs), regression models, or the like. The ML model may be trained as a diagnosis prediction model. To illustrate, the ML model may be trained to output a predicted diagnosis of a patient based on input health data associated with the patient, and the clients may include or correspond to hospitals, doctors' offices, medical groups, specialists' offices, emergency rooms, surgery centers, urgent care clinics, outpatient clinics, dentists, psychiatrists, psychologists, therapists, or the like. In some implementations, the input medical data may include or indicate symptoms, test results, observations by medical personnel, scan results, medical images (e.g., magnetic resonance imaging (MRI), X-rays, fluoroscopic images, positron-emission tomography (PET) scan images, nuclear medicine imaging, computed tomography (CT) scan images, etc.), patient information (e.g., height, weight, age, gender, etc.), patient medical history, patient family history, current medications, currently diagnosed conditions, other information, or a combination thereof. For example, the ML model may be trained to predict one of multiple preconfigured diagnoses, such as diseases or other conditions, based on one or more underlying combinations of symptom(s), age, medical history, test results, and other medical information. As a particular non-limiting example, the diagnosis prediction model may output a diagnosis of diabetes based on medical information that includes patient information (e.g., age and weight), diet information, and symptoms. Although described herein in the context of diagnosis prediction based on medical data, in other implementations, the ML model may be trained to perform other types of predictions for other clients, such as in the financial industry, network service providers, government agencies, or any other environment in which data privacy is important or required.

To initiate training of an ML model, the server 102 may execute the executable file package 110. Execution of the executable file package 110 may cause the server 102 to generate the initial ML model parameter set 112 that represents an initial ML model (e.g., an initial diagnosis prediction model). The initial ML model parameter set (and other ML model parameter sets described herein) include values of one or more structural parameters that represent configurations of respective ML models. For example, if the initial ML model is a NN, the structural parameters may include a number of layers, a number of hidden layers, a number of nodes per layer or per type of layer, a number of input nodes, a number of output nodes, a number of hidden nodes, a number of connections per node, weights of connections, activation functions associated with nodes, or the like. The structural parameters may include one or more of what may be referred to in some ML literature as model parameters and/or hyperparameters. If the ML is a SVM, a decision tree, a random forest, a regression model, a BN, a DBN, a NB model, a Gaussian process, a HMM, a regression model, or the like, the corresponding structural parameters are specific to the type of ML model.

After generating the initial ML model parameter set 112, the server 102 may receive training data from the client devices to train an initial ML model, such as receiving encrypted training data for use in training the initial ML model that corresponds to the initial ML model parameter set 112. To illustrate server-side training implementations, the client devices 140 and 150 may execute respective copies of the executable file package 144 to cause the client devices 140 and 150 to encrypt respective client data and provide the encrypted client data to the server 102 for use as training data. For example, the first client device 140 may generate the first public key 146 and the first private key 148 based on one or more HE libraries included in the executable file package 144, and the first client device 140 may encrypt the first client data 142 based on the first public key 146 to generate first encrypted data 170. As another example, the Nth client device 150 may generate the Nth public key 156 and the Nth private key 158 based on one or more HE libraries included in the executable file package 144, and the Nth client device 150 may encrypt the Nth client data 152 based on the Nth public key 156 to generate Nth encrypted data 172. Because the public keys are generated based on HE libraries, encrypting the client data based on the public keys may homomorphically encrypt the client data such that operations performed on the encrypted data may function similarly to operations performed on non-encrypted data and/or the resultant data may be meaningful once decrypted. The client devices 140 and 150 may provide respective encrypted data and respective public keys to the server 102. For example, the first client device 140 may provide the first encrypted data 170 and the first public key 146 to the server 102, and the Nth client device 150 may provide the Nth encrypted data 172 and the Nth public key 156 to the server 102. The client devices 140 and 150 may provide the respective encrypted data and public keys by transmitting the respective encrypted data and public keys to the server 102 or by storing the respective encrypted data and public keys at a storage location that is accessible to the server 102, as further described with reference to FIGS. 2-4. Encrypting the client data prior to transmission and retaining the corresponding private keys at the client devices maintains the privacy of client data because neither the server 102 nor any other client device is provided with key that can decrypt the encrypted data.

In some implementations, the executable file package 144 may include one or more pre-processing libraries and any other files or information to enable the client devices 140 and 150 to selectively perform pre-processing on the respective client data prior to using the client data as training data. For example, the first client device 140 may selectively perform one or more pre-processing operations on the first client data 142 prior to using the first client data 142 as training data, and the Nth client device 150 may selectively perform one or more pre-processing operations on the Nth client data 152 prior to using the Nth client data 152 as training data. The pre-processing operations may include extracting a particular set of feature values from the respective client data, removing or discarding features having duplicate or null values, extrapolating one or more missing feature values, formatting feature values, discarding one or more particular features, compressing or encoding one or more feature values, other pre-processing operations, or a combination thereof. Additionally or alternatively, the pre-processing operations may include removing one or more features that are not included in a common training data format, estimating values for one or more features of the common training data format that are not included in the respective client data, or a combination thereof. The pre-processing may be performed automatically, based on a comparison of the respective client data to a common training data format, based on a statistical analysis of the respective client data, or the like. To illustrate, the first client device 140 may determine whether a format of the first client data 142 matches a common format of training data for the machine learning. If the format of the first client data 142 matches the common format (or a similarity between the first client data 142 and the common format satisfies a threshold), the first client device 140 may perform relatively minor pre-processing, or no pre-processing, on the first client data 142. The relatively minor pre-processing may include adding a few missing feature values, such as by extrapolating a missing value of a particular feature based on other values of the same feature or the like, removing duplicate values, or the like, or feature extraction such as extracting values of a set of preconfigured features from the first client data 142. If the format of the first client data 142 does not match the common format (or the similarity between the first client data 142 and the common format fails to satisfy the threshold), the first client device 140 may perform one or more pre-processing operations to convert the first client data 142 to the common format. For example, the first client device 140 may perform operations to discard features that are not included in the common format, change formatting of the first client data 142 (e.g., data types, numbers of digits or characters, etc.), estimate values for one or more missing features in the common format, or the like. The Nth client device 150 may perform similar pre-processing operations on the Nth client data 152. Because client data is pre-processed prior to encryption, the encrypted client data from each client device effectively has a common format for encrypted data. Pre-processing the respective client data prior to training an ML model may enable aggregation of the client data from different clients for training of a global ML model that can be used by clients that have different data formats. Additionally, configuring the executable file package 144 to control the pre-processing frees the clients from perform their own pre-processing on their client data, which may require additional software or a trained data technician.

After receiving the encrypted data 170 and 172 and the public keys 146 and 156 from the client devices 140 and 150, respectively, the executable file package 110 may cause the server 102 to aggregate the received encrypted data to construct an ML model (e.g., a global ML model) for use by the client devices 140 and 150. The server 102 may aggregate the encrypted client data to generate encrypted training data for use in training an initial ML model that is implemented based on the initial ML model parameter set 112. For example, the server 102 may aggregate the first encrypted data 170 and the Nth encrypted data 172 to generate the aggregated encrypted client data 114, and the server 102 may provide the aggregated encrypted client data 114 as training data to the initial ML model to train the initial ML model to output a predicted diagnosis based on input data. In such implementations, training the initial ML model based on the aggregated encrypted client data 114 generates a global ML model parameter set, referred to as the aggregated ML model parameter set 116.

In some implementations, aggregating the encrypted client data may include weighting the encrypted client data prior to aggregation. To illustrate, the server 102 may assign the weights 118 to the encrypted client data received from the client devices prior to providing the weighted encrypted client data as training data to the initial ML model. The server 102 may assign the weights 118 based on client-related factors associated with the clients from which the encrypted client data is received. The client-related factors may include size of the client data sets, processing capabilities of the client devices, priorities associated with the clients, expected usage of the provided ML services by the clients, or other factors. As an example, if the first client data 142 has significantly larger relative size than the Nth client data 152, the server 102 may assign a relatively high weight to the first encrypted data 170 and a relatively low weight to the Nth encrypted data 172, such as a first weight of 0.8 and a second weight of 0.2, respectively. As another example, if the first client has lower priority than the second client, the server 102 may assign a relatively low weight to the first encrypted data 170 and a relatively high weight to the Nth encrypted data 172, such as a first weight of 0.5 and a second weight of 0.6, respectively. It will be appreciated that the weights assigned to the various encrypted data sets may be similarly based on any desired characteristic or information related to the clients. After assigning the weights 118, the server 102 may aggregate the weighted encrypted data sets to generate the aggregated encrypted client data 114.

After the training process is complete and the aggregated ML model parameter set 116 is finalized, the executable file package 110 may cause the server 102 to deploy the aggregate ML model. The aggregate ML model implemented based on the aggregated ML model parameter set 116 may be configured to predict a diagnosis for a patient based on input data associated with the patient. Because the aggregate ML model (e.g., the diagnosis prediction model) is trained based on encrypted client data, the aggregate ML model is configured to receive encrypted input data and output an encrypted prediction. The encrypted prediction may be encrypted based on the public key received from the client device that provides the encrypted input data (e.g., an encrypted request). Deploying the diagnosis prediction model may include providing encrypted ML model parameter sets to the client devices 140 and 150. For example, the server 102 may encrypt the aggregated ML model parameter set 116 based on the first public key 146 and transmit this encrypted ML model parameter set to the first client device 140, and the server 102 may encrypt the aggregated ML model parameter set 116 based on the Nth public key 156 and transmit this encrypted ML model parameter set to the Nth client device 150. Alternatively, the server 102 may train and construct individual ML models for each of the client devices 140 and 150, and the server 102 may encrypt the individual ML models using the respective public keys for transmission to the first client device 140 and the Nth client device 150. Each of the client devices may decrypt a respective received encrypted ML model parameter set based on a respective private key to implement a client-side diagnosis prediction model. For example, the first client device 140 may decrypt a first received encrypted ML model parameter set based on the first private key 148, and the Nth client device 150 may decrypt an Nth received encrypted ML model parameter set based on the Nth private key 158. Additionally or alternatively, the server 102 may deploy the aggregated ML model parameter set 116 to an endpoint node that implements an ML model to provide similar diagnosis predictions at the endpoint node. Although client data, ML model parameter sets, and predictions are described above as being encrypted based on client-specific public keys, in other implementations, encryption of deployed ML model parameter sets may be performed using a common public key, each client device may receive a respective secret key, and partial decryption by a threshold number of client devices (e.g., based on respective secret keys) may enable decryption of encrypted ML model parameter sets, as further described with reference to FIG. 3.

If the aggregated ML model parameter set 116 is deployed to the endpoint node or otherwise hosted by the server 102, the server 102 (or the endpoint node) may be configured to provide ML services to the client devices, user devices that subscribe to the ML services, other devices, or a combination thereof. The ML services may include receiving requests that indicate medical data of patient(s) and providing predicted diagnoses associated with the patient(s). To illustrate, the user device 160 may execute the executable file package 164 to participate in the ML services. In some implementations, the executable file package 164 (e.g., a user-side executable file package) may include a configuration file, an operating system, scripts, preprocessing libraries, HE libraries, and the like, without including the ML libraries and files of the executable file package 110. Execution of the executable file package 164 may cause the user device to generate a request based on the request data 162 stored at (or accessible to) the user device 160 and to encrypt the request based on a public key of the user device 160 to generate an encrypted request 180. The request data 162 may include medical data associated with a patient, and the request may include feature data extracted from the request data 162 for use in predicting a diagnosis associated with the patient, and the encrypted request 180 may be homomorphically encrypted using the public key. If the user device 160 includes or corresponds to the client devices 140 or 150, the public key includes or corresponds to the public keys 146 or 156. Alternatively, if the user device 160 did not participate in training the diagnosis prediction model, the user device 160 may generate a public-private key pair based on the one or more HE libraries included in the executable file package 164, similar to the client devices 140 and 150. In some implementations, the user device 160 may perform one or more pre-processing operations on the request data 162 prior to encrypting the encrypted request 180, similar to the pre-processing operations performed by the client devices 140 and 150.

The user device 160 may transmit the encrypted request 180 to the endpoint node (and the public key generated by the user device 160 if the public key has not already been shared with the endpoint node or the server 102), or to the server 102 if the server 102 facilities communication with the endpoint node or support the diagnosis prediction model (e.g., the aggregated ML model parameter set 116). The encrypted request 180 may be provided as input data to the diagnosis prediction model, and the diagnosis prediction model may output an encrypted prediction 182 that indicates the diagnosis predicted based on the encrypted request 180. The endpoint node, or the server 102, may transmit the encrypted prediction 182 to the user device 160. The user device 160 may decrypt the encrypted prediction 182 based on the private key generated by the user device 160. After decrypting the encrypted prediction 182 to generate a predicted diagnosis, the user device 160 may initiate performance of one or more actions based on the predicted diagnosis. For example, if the predicted diagnosis is associated with a prescribed drug, the user device 160 may transmit a prescription request to a pharmacy computer system to request the prescribed drug for the patient. As another example, if the predicted diagnosis is associated with a medical procedure, the user device 160 may schedule the medical procedure on an electronic calendar of the user (e.g., client), the patient, another entity, or a combination thereof.

Although described above for server-side training implementations, the techniques described above may be extended to client-side training implementations to provide secure cooperative learning, such as federated learning or split learning. In some such implementations, the server 102 may provide a respective copy of the initial ML model parameter set 112 to each of the client devices 140 and 150 for client-side training, and the client devices 140 and 150 may execute respective copies of the executable file package 144 to cause the client devices 140 and 150 to implement a respective ML model, encrypt respective client data, and provide the encrypted client data to the respective ML model as training data. After the client devices 140 and 150 train the respective ML models, the client devices may provide respective trained ML model parameter sets to the server 102 for use in constructing the aggregated ML model parameter set 116. For example, the server 102 may aggregate the received parameter sets by averaging corresponding structural parameter values from different parameter sets (corresponding to different ML models, optionally after assigning the weights 118 to the parameter sets), such as an average number of hidden layers, an average number of output nodes, an average weight for one or more connections between nodes, or the like. Sharing the trained ML model parameters instead of the encrypted client data may further improve the privacy and security of client data because the trained ML model parameter sets are not able to be processed to reconstruct the client data, and thus private client data is not shared with other devices. However, achieving such enhanced privacy comes at the expense of training ML models at the client devices, which increases costs and complexity of the client devices that participate in client-side training as compared to client devices that participate in server-side training.

As described above, the system 100 supports secure training of ML models that preserves privacy of client data used to train the ML models. Privacy is preserved because client-specific data (e.g., the first client data 142 and the Nth client data 152) is encrypted before being shared with the server 102. Because the client data is homomorphically encrypted, an ML model can be trained based on encrypted data as though it were being trained on non-encrypted data due to homomorphic encryption permitting operations to be performed on encrypted data to generate an encrypted result, that when decrypted, produces the same result as if the computations had been performed on non-encrypted data. Thus, privacy of sensitive client data is preserved while enabling the system 100 to train a diagnostic model. If clients do not consent to collaborative learning, the system 100 can train individual diagnosis prediction models for the clients based on their respective client data without being able to decrypt, and therefore access, the client data. Alternatively, the system 100 may be configured to train a more robust diagnostic prediction model by using multiple different client data sets to construct a global diagnosis prediction model. By using the distributed executable file packages, this training of diagnosis prediction models may be performed by a server of a cloud services provider that otherwise is configured for single client ML model training using non-encrypted data. Additionally, because the participation of the clients is initiated and controlled by execution of the respective executable file packages, a client does not need to employ a computer programmer or data scientist to oversee and control the client-side encrypting and pre-processing operations.

Figure 2:
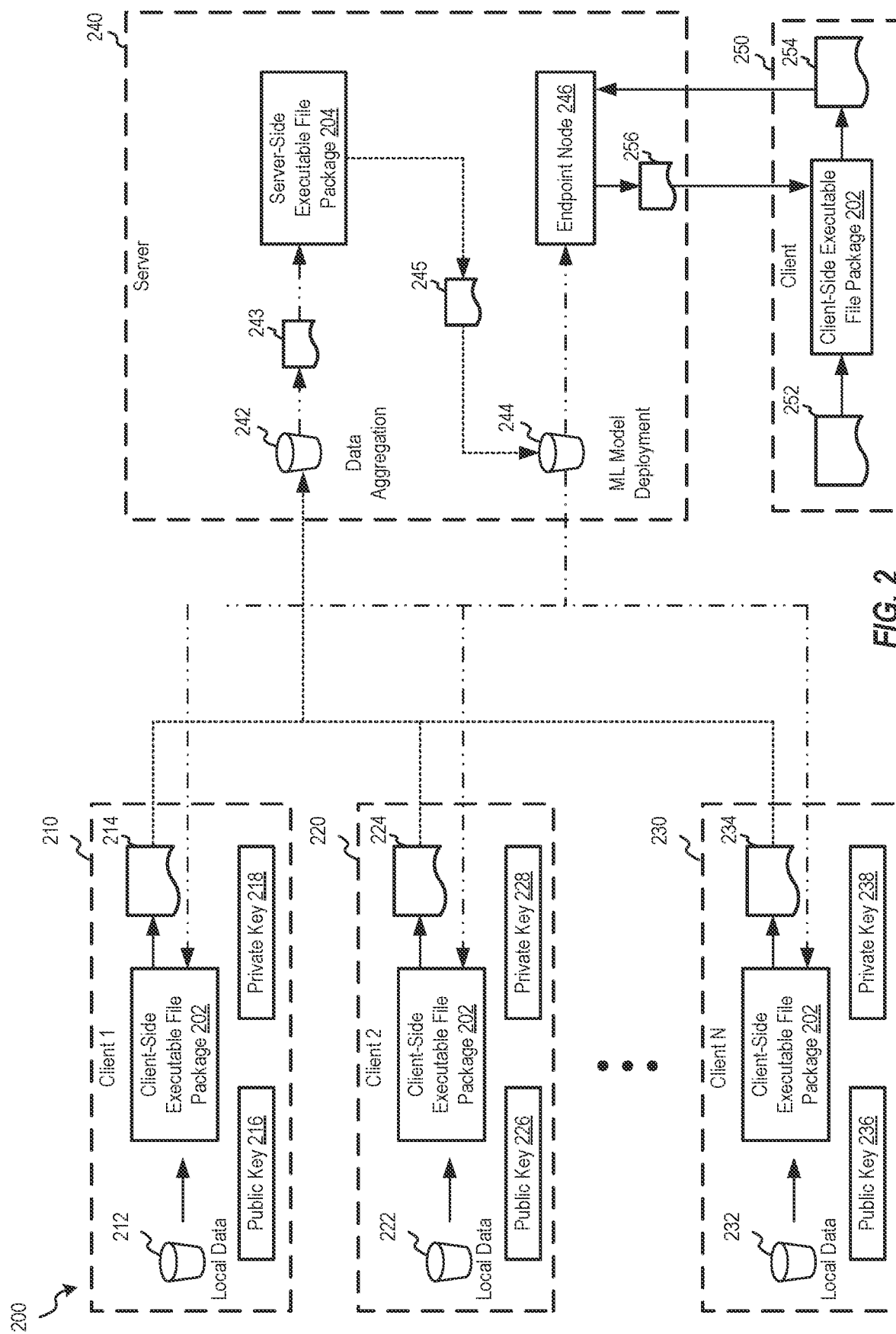
FIG. 2 is a block diagram of an example of a system that supports server-side training of ML models using homomorphic encryption of data according to one or more aspects.

Referring to FIG. 2, an example of a system that supports server-side training of ML models using homomorphic encryption of data according to one or more aspects is shown as a system 200. In some implementations, the system 200 of FIG. 2 may include or correspond to the system 100 of FIG. 1 (or components thereof). As shown in FIG. 2, the system 200 includes a first client 210 ("Client 1"), a second client 220 ("Client 2"), an Nth client 230 ("Client N"), and a server 240. Although three clients are shown in FIG. 2, in other implementations the system 200 may include fewer than three or more than three clients. Each of the clients 210, 220, and 230 and the server 240 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 210, 220, and 230 and the server 240 may include or correspond to different types of distributed or networked computing resources, or the clients 210, 220, and 230 and the server 240 may include or correspond to respective devices connected via one or more networks.

Each client may include a storage location for storing local data. To illustrate, the first client 210 may include a first storage location 212, the second client 220 may include a second storage location 222, and the Nth client 230 may include a third storage location 232. The first storage location 212 may be configured to store private client data of the first client 210 that is to be used as training data for a global ML model (or in some other implementations, individual client-specific ML models). Storage locations 222 and 232 may be similarly configured for the second client 220 and the Nth client 230. None of the storage locations 212, 222, or 232 are accessible to any other client. Each client may receive and execute a client-side executable file package 202 to cause the respective client to participate in the training of ML models described herein. The client-side executable file package 202 may include a configuration file, one or more HE libraries, one or more pre-processing files or libraries, an operating system, one or more scripts, other files or data, or a combination thereof. In some implementations, the client-side executable file package 202 may include or correspond to a Docker container. Execution of the client-side executable file package 202 may cause the clients to generate respective public-private key pairs for use in homomorphically encrypting data to be shared with the server 240. For example, the first client 210 may generate a first public key 216 and a first private key 218 (e.g., that is configured to decrypt data encrypted using the first public key 216), the second client 220 may generate a second public key 226 and a second private key 228, and the Nth client 230 may generate an Nth public key 236 and an Nth private key 238.

The server 240 may include a client data storage location 242 that is configured to store encrypted client data and public keys received from the clients and an ML model storage location 244 that is configured to store one or more ML models for deployment. The client data storage location 242 and the ML model storage location 244 may be accessible to the clients 210, 220, and 230. In some implementations, the clients 210, 220, and 230 have write access to the client data storage location 242 and read access to the ML model storage location 244. In some other implementations, the clients 210, 220, and 230 have read and write access to both the client data storage location 242 and the ML model storage location 244. In such implementations, client data is kept private and secure due to the client data being encrypted prior to being provided to the client data storage location 242. The server 240 may receive and execute a server-side executable file package 204 to cause the server 240 to perform the secure training of ML models described herein. The server-side executable file package 204 may include a configuration file, one or more ML libraries, one or more HE libraries, an operating system, one or more scripts, other files or data, or a combination thereof. In some implementations, the server-side executable file package 204 may include or correspond to a Docker container. In some implementations, the server 240 includes or supports an endpoint node 246 that can be configured to provide ML services based on a trained ML model.

Execution of the client-side executable file package 202 and the server-side executable file package 204 may cause the clients 210, 220, and 230 and the server 240 to collaborate to train an ML model to output a predicted diagnosis based on input medical data. In the server-side training described with reference to FIG. 2, the server 240 initializes a global ML model (e.g., an initial ML model) to be trained based on encrypted client data from participating clients. Although all three of the clients 210, 220, and 230 are described as participating, in other implementations, some clients may participate in training the ML model and in receiving ML services, some clients may subscribe to the ML services without participating in the training, and some clients may participate in the training (e.g., for a fee or other incentive) but not subscribe to the ML services. Each participating client encrypts respective client data based on a respective public key and provides the encrypted client data and the public key to the server 240. The server 240 aggregates the encrypted client data as training data to train a global ML model (e.g., a diagnosis prediction model) for deployment.

To illustrate, execution of the client-side executable file package 202 by the clients 210, 220, and 230 may cause the clients 210, 220, and 230 to collaboratively train the initial ML model. In some implementations, the client-side executable file package 202 includes an operating system for running on the client cloud services to enable, in combination with scripts, HE libraries, and other files, retrieval of client data, homomorphic encryption of the client data, and communication of the encrypted client data to the server 240. Additionally or alternatively, the client-side executable file package 202 may include a configuration file that designates the locations and configurations of the client-side storage locations. The first client 210 may execute the client-side executable file package 202 to participate in the collaborative training of an ML model for diagnosis prediction. To illustrate, execution of the client-side executable file package 202 may cause the first client 210 to retrieve (e.g., pull or prompt the client to provide) client-specific medical data, such as from a client device or database, and store the medical data at the first storage location 212. The medical data may be labeled based on a diagnosis that correspond to the medical data (e.g., historical diagnosis determined by a medical services provider or system based on historical medical data, such as historical patient data, historical symptoms data, historical test results data, historical operation results data, historical medical imaging data, other historical medical data, or a combination thereof).

In some implementations, the client-side executable file package 202 includes one or more pre-processing files or libraries, and execution of the client-side executable file package 202 may cause the first client 210 to selectively perform one or more pre-processing operations on the client data. The one or more pre-processing operations may be configured to eliminate duplicate or null features, add one or more missing feature values, convert the client data to a common format, extract one or more particular features, perform other types of pre-processing, or a combination thereof. To illustrate, the first client 210 may determine whether a format of the client data stored at the first storage location 212 matches a common format of training data for the initial ML model. If the format of the client data matches the common format (or a similarity between the client data and the common format satisfies a threshold), the first client 210 may perform relatively minor pre-processing, or no pre-processing, on the client data. The relatively minor pre-processing may include adding a few missing feature values, such as by extrapolating a missing value of a particular feature based on other values of the same feature or the like, removing duplicate values, or the like, or feature extraction such as extracting a values of a set of preconfigured features from the client data. If the format of the client data does not match the common format (or the similarity between the client data and the common format fails to satisfy the threshold), the first client 210 may perform one or more pre-processing operations to convert the client data to the common format. For example, the first client 210 may perform operations to discard features that are not included in the common format, change formatting of the client data (e.g., data types, numbers of digits or characters, etc.), estimate values for one or more missing features in the common format, or the like. Pre-processing the client data prior to encrypting the client data may enable aggregation of the resulting client data from different clients for training of a global ML model that can be used by clients that have different data formats. Additionally, configuring the client-side executable file package 202 to control the pre-processing frees the clients from perform their own pre-processing on their client data, which may require additional software or a trained data technician.

Execution of the client-side executable file package 202 may cause the first client 210, after optionally pre-processing the client data stored at the first storage location 212, to encrypt the client data stored at the first storage location 212. For example, the first client 210 may encrypt the client data based on the first public key 216 to generate first encrypted data 214. Execution of the client-side executable file package 202 may also cause the first client 210 to provide the first encrypted data 214 and the first public key 216 to the server 240. For example, the first client 210 may store the first encrypted data 214 and the first public key 216 at the client data storage location 242 (or the server 240 may issue a pull operation to retrieve the first encrypted data 214 and the first public key 216 from the first client 210). Because the client data is encrypted before being shared with the server 240, the private client data of the first client 210 is not exposed to the server 240 or to other clients. Additionally, because the first public key 216 is generated based on one or more HE libraries to support homomorphic encryption, an ML model may be trained based on encrypted data as though the data was not encrypted.

Similar operations may be performed by the second client 220 and the Nth client 230. For example, execution of the client-side executable file package 202 may cause the second client 220 to retrieve and store client data at the second storage location 222 and, after optionally pre-processing the client data, encrypt the client data based on the second public key 226 to generate second encrypted data 224. The second client 220 may store the second encrypted data 224 and the second public key 226 at the client data storage location 242. As another example, execution of the client-side executable file package 202 may cause the Nth client 230 to retrieve and store client data at the third storage location 232 and, after optionally pre-processing the client data, encrypt the client data based on the Nth public key 236 to generate Nth encrypted data 234. The Nth client 230 may store the Nth encrypted data 234 and the Nth public key 236 at the client data storage location 242.

Execution of the server-side executable file package 204 may cause the server 240 to obtain the encrypted data 214, 224, and 234 and the public keys 216, 226, and 236 from the client data storage location 242. The server-side executable file package 204 may be configured with read and write access to the client data storage location 242 and the ML model storage location 244 and may include one or more ML libraries and any other files needed to support initialization, aggregation, and validation of ML models. The server-side executable file package 204 may also include one or more HE encryption libraries to enable homomorphic encryption of information, such as ML model parameter sets, for communication to the clients. The server 240 may aggregate the encrypted client data as training data 243 that is used to train the initial ML model. The server-side executable file package 204 may include the ML libraries, files, and other information described above to enable the server 240 to perform ML model initialization, aggregation, and validation/evaluation. For example, the server 240 may divide the aggregated client data into training data and validation data, and server 240 may use the training data to train the initial ML model, which may then be validated (e.g., evaluated) using the validation data. Validation may include evaluating whether an accuracy of the trained ML model matches a threshold when the validation data is provided as input data, and if the accuracy does not satisfy the threshold, performing one or more iterations of training and validation until the accuracy satisfies the threshold (or until another validation criteria is satisfied). Training the initial ML model may result in constructing a diagnosis prediction model parameter set 245.

Execution of the server-side executable file package 204 may conclude with storing of the diagnosis prediction model parameter set 245 at the ML model storage location 244 and initiation of deployment of the diagnosis prediction model to the endpoint node 246 or at least some of the clients 210, 220, or 230. In some implementations, the server 240 deploys the diagnosis prediction model by uploading the diagnosis prediction model parameter set 245 to the endpoint node 246 for implementation of a diagnosis prediction model at the endpoint node 246. For example, uploading the diagnosis prediction model parameter set 245 may configure the endpoint node 246 to provide ML services to one or more clients, such as a client 250. The client 250 may include or correspond to one or more of the clients 210, 220, and 230, or a client that subscribes to the ML service but does not participate in the training process. To illustrate, the client 250 may execute the client-side executable file package 202 to retrieve request data 252 and, after optionally preprocessing the request data 252, encrypt the request data 252 based on a respective public key to generate an encrypted request 254. The request data 252 may indicate medical data associated with a patient for which a diagnosis is being requested. The client 250 may provide the encrypted request 254 and the public key to the endpoint node 246 for use in diagnosis prediction. The endpoint node 246 may receive the encrypted request 254 from the client 250 and may provide the encrypted request 254 as input data to the diagnosis prediction model to cause the diagnosis prediction model to output an encrypted prediction 256. The encrypted prediction 256 indicates a predicted diagnosis for the patient based on the encrypted request 254, and the encrypted prediction 256 is encrypted based on the public key received from the client 250. The endpoint node 246 may transmit the encrypted prediction 256 to the client 250, and execution of the client-side executable file package 202 may cause the client 250 to decrypt the encrypted prediction 256 based on a respective private key to generate a non-encrypted prediction for display or output at, or use by, the client 250. For example, if the client 250 includes or corresponds to the client 210, 220, or 230, the public key includes or corresponds to the public keys 216, 226, or 236 and the private key includes or corresponds to the private keys 218, 228, or 238, respectively.

Additionally or alternatively, the server 240 may deploy the diagnosis prediction model to the one or more of the clients 210, 220, and 230 for local diagnosis prediction model implementations, similar to the endpoint node 246. Alternatively, the server 240 may deploy the diagnosis prediction model to the clients 210, 220, and 230 by storing encrypted copies of the diagnosis prediction model parameter set 245 at the ML model storage location 244 for retrieval by (or communication to) one or more of the clients 210, 220, and 230. For example, the server 240 may encrypt a first copy of the diagnosis prediction model parameter set 245 based on the first public key 216 for the first client 210, a second copy of the diagnosis prediction model parameter set 245 based on the second public key 226 for the second client 220, and an Nth copy of the diagnosis prediction model parameter set 245 based on the Nth public key 236 for the Nth client 230. The server 240 may initiate transmission of the encrypted diagnosis prediction model parameter sets to the clients 210, 220, and 230, or the clients 210, 220, and 230 may retrieve the encrypted diagnosis prediction model parameter sets from the ML model storage location 244, for implementation of local diagnosis prediction models at the clients 210, 220, and 230. For example, the first client 210 may decrypt the encrypted diagnosis prediction model parameter set based on the first private key 218 to implement a first local diagnosis prediction model at the first client 210, the second client 220 may decrypt the encrypted diagnosis prediction model parameter set based on the second private key 228 to implement a second local diagnosis prediction model at the second client 220, and the Nth client 230 may decrypt the encrypted diagnosis prediction model parameter set based on the Nth private key 238 to implement an Nth local diagnosis prediction model at the Nth client 230. Each client may execute the client-side executable file package 202 to encrypt request data, provide the encrypted request data as input data to the local diagnosis prediction model as input data to cause the local diagnosis prediction model to output an encrypted prediction, and decrypt the encrypted prediction, similar to described above with reference to the client 250. As a non-limiting example, execution of the client-side executable file package 202 may cause the first client 210 to encrypt request data obtained from the first storage location 212 based on the first public key 216 to generate the encrypted request data, and to decrypt the encrypted prediction based on the first private key 218.

In some implementations, the server 240 may be configured to train at least one diagnosis prediction model to output non-encrypted predictions. To illustrate, one or more of the clients 210, 220, and 230 may provide encrypted predictions (e.g., encrypted labels) output by local diagnosis prediction models and the decrypted predictions generated using the respective private keys (e.g., decrypted labels) to the server 240, such as by storage at the client data storage location 242. The server 240 may configure a diagnosis prediction model, such as the diagnosis prediction model deployed to the endpoint node 246, to translate the encrypted predictions output by the diagnosis prediction model to non-encrypted predictions prior to transmitting the predictions to the requesting clients. For example, the encrypted predictions and decrypted predictions may be used as additional training data, or as mapping data, such that the endpoint node 246 provides a non-encrypted prediction in response to an encrypted request from a client device.

Figure 3A:
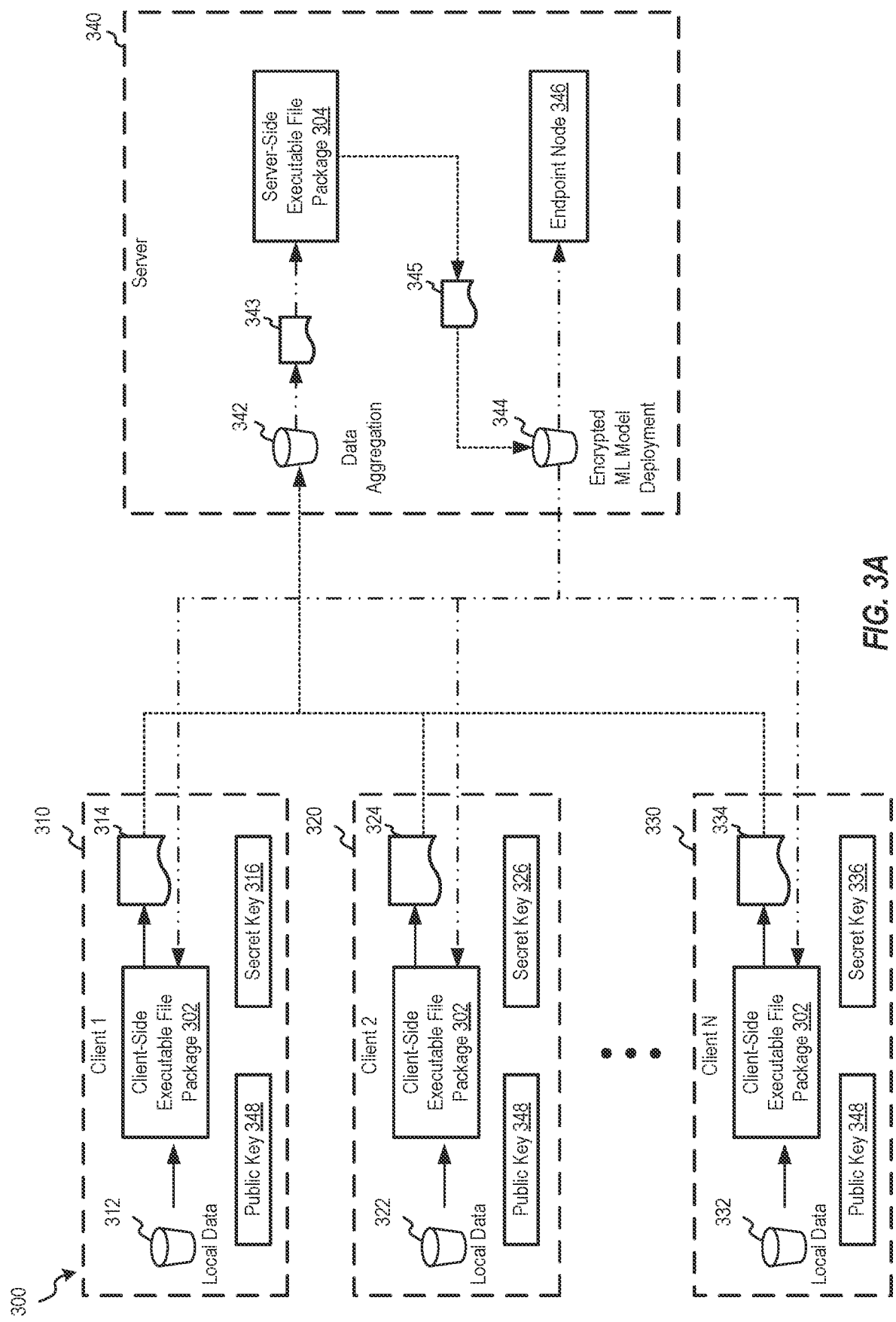
FIGS. 3A-B are block diagrams of an example of a system that supports server-side decryption of encrypted ML models using a threshold key according to one or more aspects.
Figure 3B:
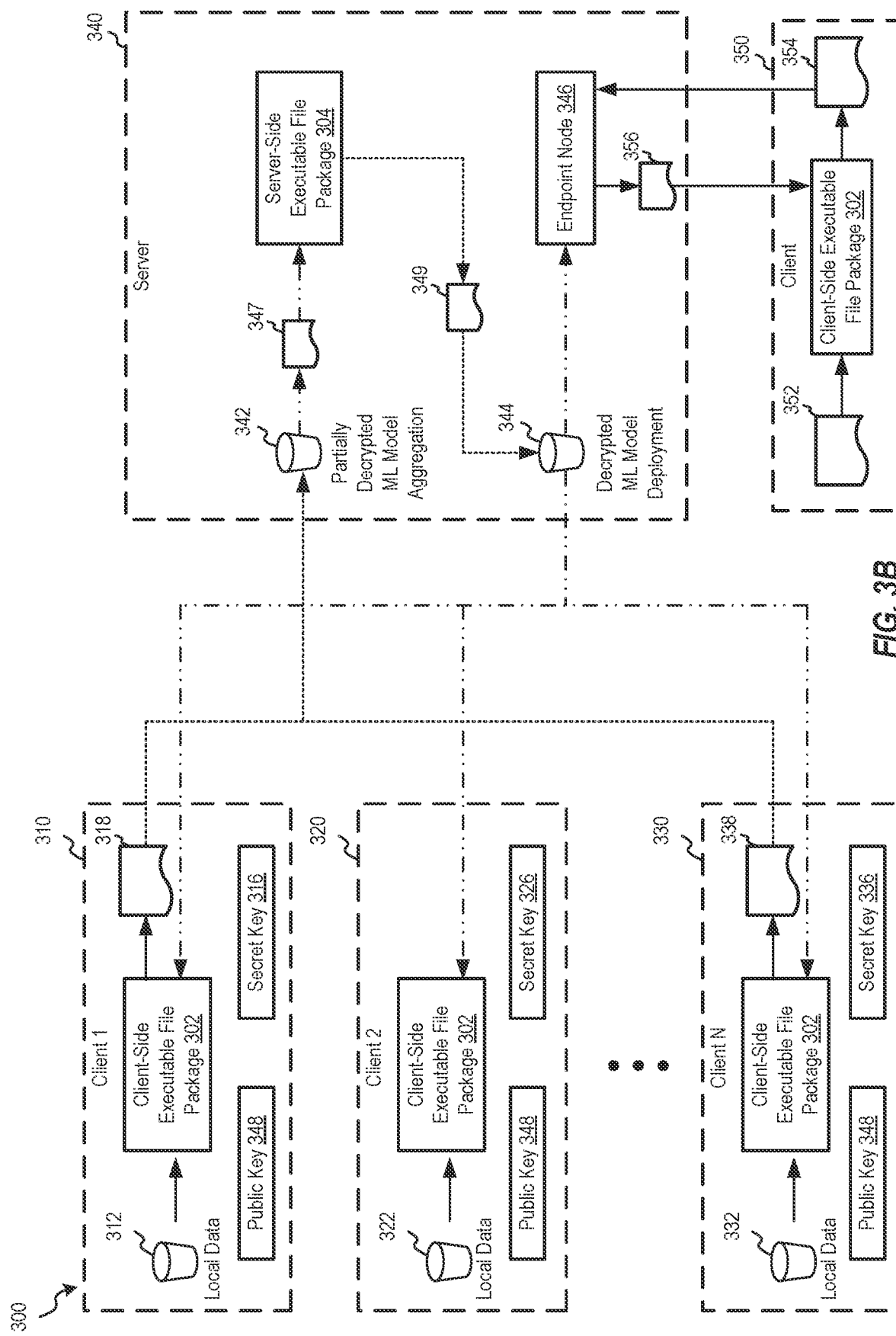

Referring to FIGS. 3A-B, an example of a system that supports server-side decryption of encrypted ML models using a threshold key according to one or more aspects is shown as a system 300. In some implementations, the system 300 of FIGS. 3A-B may include or correspond to the system 100 of FIG. 1 (or components thereof).

As shown in FIG. 3A, the system 300 includes a first client 310 ("Client 1"), a second client 320 ("Client 2"), an Nth client 330 ("Client N"), and a server 340. Although three clients are shown in FIG. 3A, in other implementations the system 300 may include fewer than three or more than three clients. Each of the clients 310, 320, and 330 and the server 340 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 310, 320, and 330 and the server 340 may include or correspond to different types of distributed or networked computing resources, or the clients 310, 320, and 330 and the server 340 may include or correspond to respective devices connected via one or more networks.

Each client may include a storage location for storing local data. To illustrate, the first client 310 may include a first storage location 312 configured to store private client data of the first client 310 to be used as training data, the second client 320 may include a second storage location 322 configured to store private client data of the second client 320 to be used as training data, and the Nth client 330 may include a third storage location 332 configured to store private client data of the Nth client 330 to be used as training data. None of the storage locations 312, 322, or 332 are accessible to any other client. Each client may receive and execute a client-side executable file package 302 to cause the respective client to participate in the training of ML models described herein, similar as to described with reference to FIG. 2. The server 340 may include client data storage location 342 that is configured to store encrypted client data received from the clients and an ML model storage location 344 that is configured to store encrypted parameter sets corresponding to global ML models to be distributed to the clients or to other entities. The server 340 may receive and execute a server-side executable file package 304 to cause the server 340 to perform the secure training of ML models described herein, similar to as described with reference to FIG. 2. In some implementations, the server 340 includes or supports an endpoint node 346 that can be configured to provide ML services based on a trained ML model.

Execution of the client-side executable file package 302 and the server-side executable file package 304 may cause the clients 310, 320, and 330 and the server 340 to collaborate to train an ML model to output encrypted diagnosis predictions, similar to as described with reference to FIG. 2. However, in the example shown in FIG. 3A, execution of the server-side executable file package 304 may cause the server 340 to generate a common public key 348 and N secret keys. The common public key 348 may be a threshold key, such that decryption of data encrypted based on the common public key 348 is not possible based on any single secret key, but decryption is possible if a threshold number (e.g., K) devices partially decrypt the encrypted data using respective secret keys, and the K partially decrypted data sets are combined. The server 340 may distribute the common public key 348 and a respective secret key to each of the client devices, and the client devices may encrypt the client-specific data based on the common public key 348 and partially decrypt encrypted data based on the respective secret key for combination with partially decrypted data from other clients to attempt to decrypt the encrypted data.

To illustrate, the first client 310 may receive the common public key 348 and a first secret key 316, the second client 320 may receive the common public key 348 and a second secret key 326, and the Nth client 330 may receive the common public key 348 and an Nth secret key 336. The clients 310, 320, and 330 may encrypt respective client data based on the common public key 348 to generate first encrypted client data 314, second encrypted client data 324, and Nth encrypted client data 334, respectively, that is provided to the client data storage location 342. The server 340 may aggregate the received encrypted client data as training data 343 to train a diagnosis prediction model that corresponds to a diagnosis prediction model parameter set 345, and the server 340 may store an encrypted version of the diagnosis prediction model parameter set 345 at the ML model storage location 344 for distribution to the clients (or the diagnosis prediction model parameter set 345, without encryption, for deployment at the endpoint node 346). The encrypted version of the diagnosis prediction model parameter set 345 may be provided to the clients 310, 320, and 330 for partial decryption.

As shown in FIG. 3B, some of the clients may participate in decryption of the encrypted version of the diagnosis prediction model parameter set 345. For example, the first client 310 may partially decrypt the encrypted parameter set based on the first secret key 316 to generate a first partially decrypted parameter set 318, and the Nth client 330 may partially decrypt the encrypted parameter set based on the Nth secret key 336 to generate an Nth partially decrypted parameter set 338. In the example shown in FIG. 3B, the second client 320 does not participate in the decryption. The participating clients may communicate the partially decrypted parameter sets to the server 340 for aggregation. For example, the first client 310 and the Nth client may store the first partially decrypted parameter set 318 and the Nth partially decrypted parameter set 338 at the client data storage location 342. The server 340 may aggregate the received partially decrypted parameter sets as an aggregated model parameter set 347 and, if the number of participating clients satisfies the threshold (e.g., is greater than or equal to K), the server constructs a diagnosis prediction model parameter set 349 that is not encrypted. Alternatively, if the number of participating clients does not satisfy the threshold, the aggregated model parameter set 347 is not converted to a non-encrypted diagnosis prediction model.

If the diagnosis prediction model parameter set 349 is constructed, the server 340 may store the diagnosis prediction model parameter set 349 for deployment to one or more of the clients 310, 320, and 330, the endpoint node 346, or a combination thereof. The diagnosis prediction model parameter set 359 may be used to implement local diagnosis prediction models at the clients 310, 320, and 330, the endpoint node 346, or a combination thereof, as described with reference to FIG. 2. To illustrate, a client 350 may execute the client-side executable file package 302 to encrypt request data 352 based on a respective public key to generate an encrypted request 354. The client 350 may transmit the encrypted request 354 to the endpoint node 346, and the endpoint node 346 may provide the encrypted request 354 as input data to the local diagnosis prediction model to cause output of an encrypted prediction 356. The endpoint node 346 may transmit the encrypted prediction 356 to the client 350, and the client 350 may decrypt the encrypted prediction 356 based on a respective private key to obtain a non-encrypted predicted diagnosis for display at, or use by, the client 350. Similar encryption and decryption operations may be performed at clients that implement local diagnosis prediction models.

Figure 4:
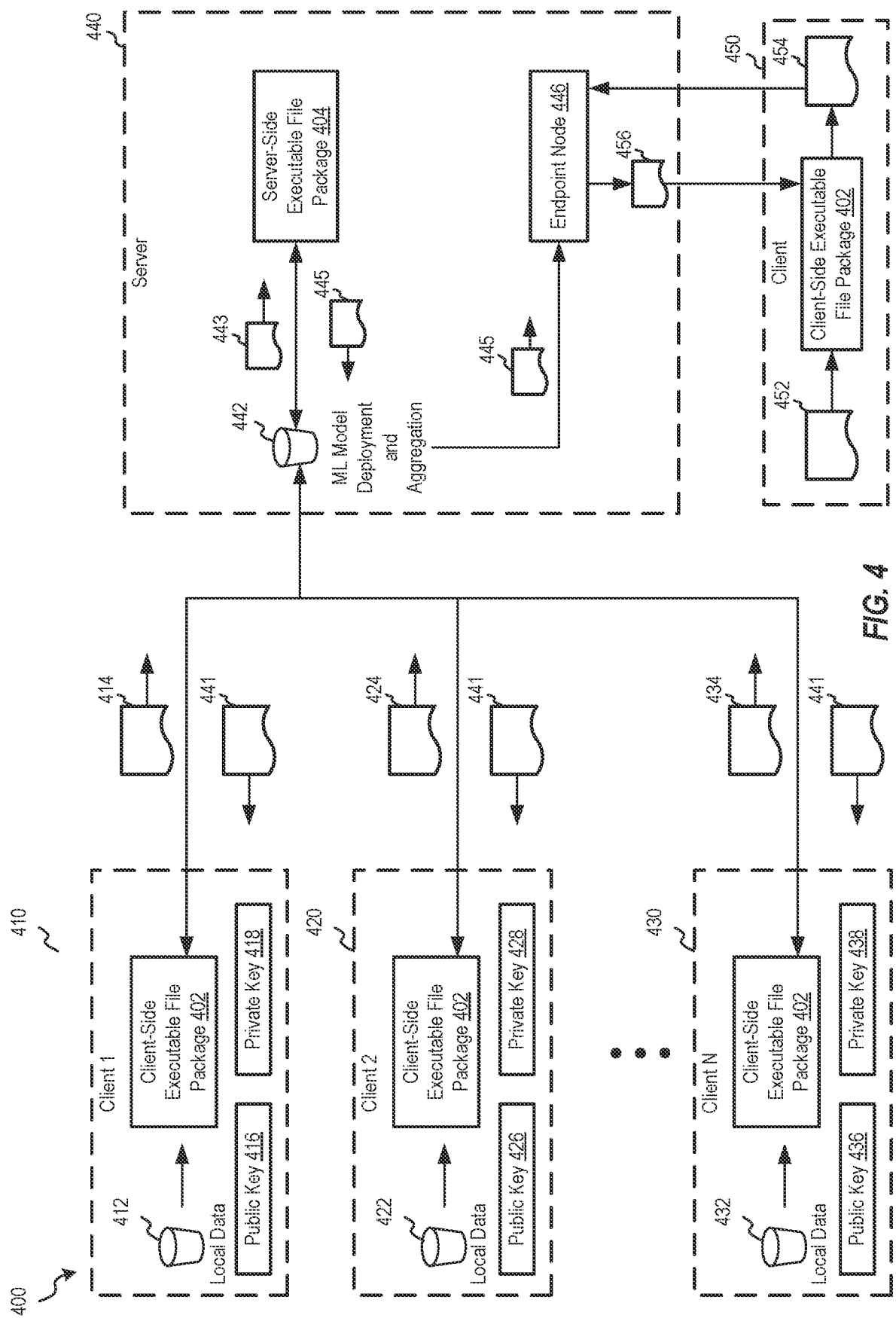
FIG. 4 is a block diagram of an example of a system that supports client-side training of ML models using homomorphic encryption of data according to one or more aspects.

Referring to FIG. 4, an example of a system that supports client-side training of ML models using homomorphic encryption of data according to one or more aspects is shown as a system 400. In some implementations, the system 400 of FIG. 4 may include or correspond to the system 100 of FIG. 1 (or components thereof). As shown in FIG. 4, the system 400 includes a first client 410 ("Client 1"), a second client 420 ("Client 2"), an Nth client 430 ("Client N"), and a server 440. Although three clients are shown in FIG. 4, in other implementations the system 400 may include fewer than three or more than three clients. Each of the clients 410, 420, and 430 and the server 440 may include or correspond to a cloud (or cloud services partition) associated with the respective entity. Each of the clouds may include one or more storage locations (e.g., memories, databases, etc.) and one or more processing resources that can receive and execute executable file packages. The entity-specific clouds may be maintained by a single service provider or by multiple service providers. Although described as clouds, in other implementations, the clients 410, 420, and 430 and the server 440 may include or correspond to different types of distributed or networked computing resources, or the clients 410, 420, and 430 and the server 440 may include or correspond to respective devices connected via one or more networks. In the example of FIG. 4, the client-side training of ML models corresponds to federated learning. In other implementations, the system 400 may be configured for other types of cooperative learning, such as split learning or federated split learning.

Each client may include a storage location for storing local data. To illustrate, the first client 410 may include a first storage location 412 configured to store private client data of the first client 410 to be used as training data, the second client 420 may include a second storage location 422 configured to store private client data of the second client 420 to be used as training data, and the Nth client 430 may include a third storage location 432 configured to store private client data of the Nth client 430 to be used as training data. None of the storage locations 412, 422, or 432 are accessible to any other client. Each client may receive and execute a client-side executable file package 402 to cause the respective client to perform the cooperative training of ML models described herein, similar as to described with reference to FIG. 2, such as generating respective public-private key pairs. For example, the first client 410 may generate a first public key 416 and a first private key 418, the second client 420 may generate a second public key 426 and a second private key 428, and the Nth client 430 may generate an Nth public key 436 and an Nth private key 438. The server 440 may include a storage location 442 that is configured to store trained parameter sets received from the clients and to store encrypted parameter sets corresponding to global ML models to be distributed to the clients or to other entities. The server 440 may receive and execute a server-side executable file package 404 to cause the server 440 to perform the cooperative training of ML models described herein, similar to as described with reference to FIG. 2. In some implementations, the server 440 includes or supports an endpoint node 446 that can be configured to provide ML services based on a trained ML model.

Instead of receiving encrypted data from the clients and performing server-side ML model training as described with reference to FIG. 2, the system 400 of FIG. 4 is configured to perform client-side ML model training. To illustrate, execution of the server-side executable file package 404 may cause the server 440 to initialize an initial ML model parameter set 441 for training at the client devices. The initial ML model parameter set 441 may be provided to the clients 410, 420, and 430, either by storage at the storage location 442 or transmission to the clients 410, 420, and 430, and the clients 410, 420, and 430 may perform local ML model training. For example, execution of the client-side executable file package 402 may cause the first client 410 to encrypt client data retrieved from the first storage location 412 based on the first public key 416, and the encrypted client data may be provided as training data to a locally implemented initial ML model. Local training of the initial ML model may result in a first trained ML model parameter set 414. Similar operations may be performed by the second client 420 and the Nth client 430 to generate a second trained ML model parameter set 424 and an Nth trained ML model parameter set 434, respectively. The clients 410, 420, and 430 may store the trained ML model parameter sets 414, 424, and 434 and the public keys 416, 426, and 436 at the storage location 442.

Execution of the server-side executable file package 404 may retrieve the client-specific ML model parameter sets (e.g., multiple ML model parameter sets 443) and public keys from the storage location 442 and to aggregate the multiple ML model parameter sets 443 to construct a diagnosis prediction model parameter set 445 that is stored at the storage location for deployment to the endpoint node 446 or one or more of the clients 410, 420, and 430. Additionally or alternatively, the server 440 may encrypt the diagnosis prediction model parameter set 445 based on one or more of the public keys and the encrypted parameter sets may be stored at the storage location 442 for deployment to one or more of the clients 410, 420, or 430, as further described above with reference to FIG. 2. As a non-limiting example, the server 440 may encrypt the diagnosis prediction model parameter set 445 based on the first public key 416 to generate a first encrypted parameter set for the first client 410, and the first client 410 may decrypt the first encrypted parameter set based on the first private key 418 to construct the diagnosis prediction model parameter set 445 for implementation of a local diagnosis prediction model.

To illustrate deployment of the diagnosis prediction model to the endpoint node 446, a client 450 may execute the client-side executable file package 402 to encrypt request data 452 based on a respective public key to generate an encrypted request 454. The client 450 may transmit the encrypted request 454 to the endpoint node 446, and the endpoint node 446 may provide the encrypted request 454 as input data to the local diagnosis prediction model to cause output of an encrypted prediction 456. The endpoint node 446 may transmit the encrypted prediction 456 to the client 450, and the client 450 may decrypt the encrypted prediction 456 based on a respective private key to obtain a non-encrypted predicted diagnosis for display at, or use by, the client 450. Similar encryption and decryption operations may be performed at clients that implement local diagnosis prediction models.

Figure 5:
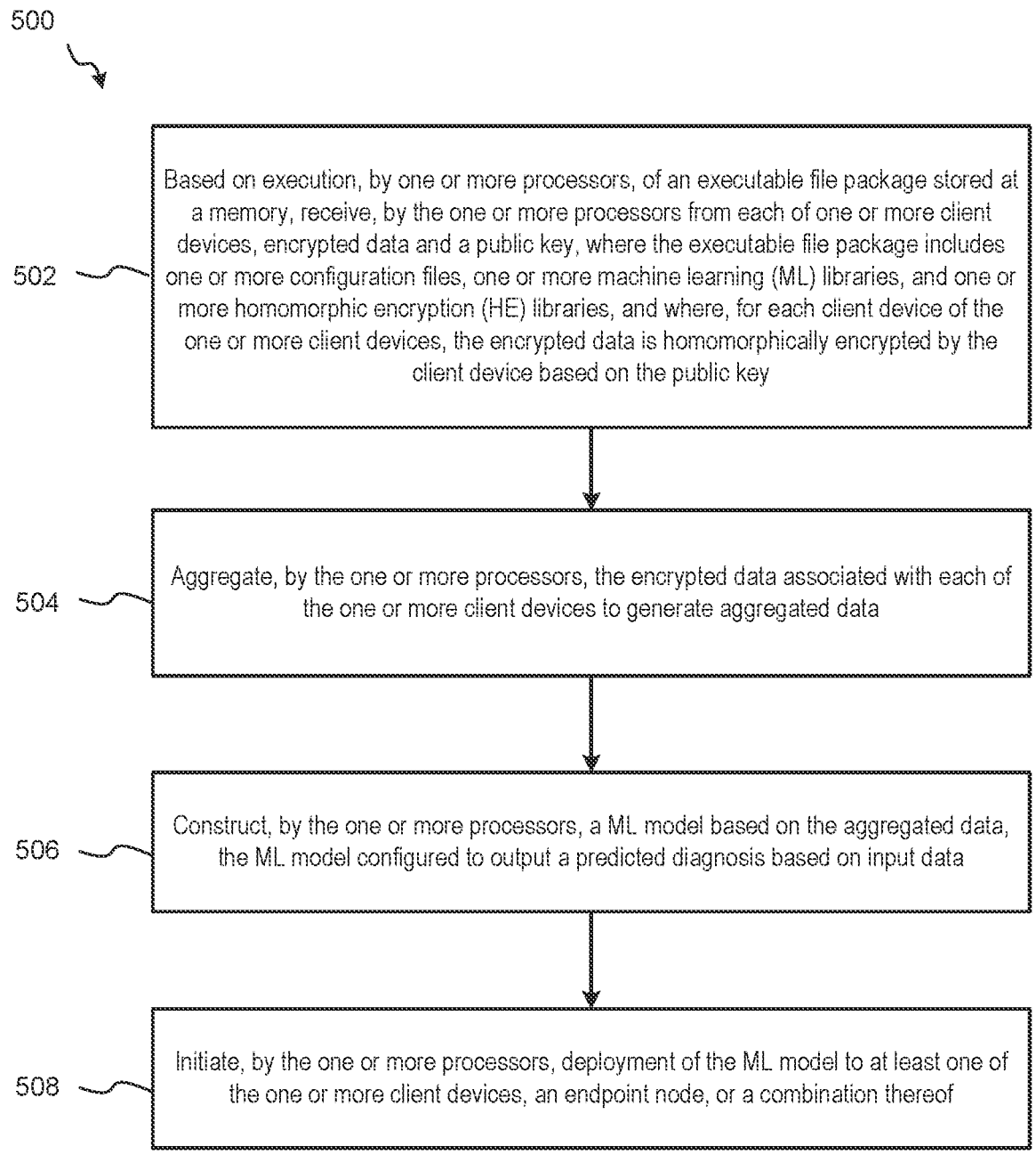
FIG. 5 is a flow diagram illustrating an example of a method for training ML models based on encrypted data using distributed executable file packages according to one or more aspects.

Referring to FIG. 5, a flow diagram of an example of a method for training ML models based on encrypted data using distributed executable file package according to one or more aspects is shown as a method 500. In some implementations, the operations of the method 500 may be stored as instructions that, when executed by one or more processors (e.g., the one or more processors of a server), cause the one or more processors to perform the operations of the method 500. In some implementations, the method 500 may be performed by a computing device, such as the server 102 of FIG. 1 (e.g., a computing device configured for providing cloud-based machine learning services), the server 240 of FIG. 2, the server 340 of FIG. 3, the server 440 of FIG. 4, or a combination thereof.

The method 500 includes executing an executable file package stored at a memory to receive, from each of one or more client devices, from each of multiple client devices, encrypted data and a public key, at 502. For example, the executable file package may include or correspond to the executable file package 110 of FIG. 1, the encrypted data may include or correspond to the first encrypted data 170 and the Nth encrypted data 172 of FIG. 1, and the public key may include or correspond to the first public key 146 and the Nth public key 156 of FIG. 1. The executable file package includes one or more configuration files, one or more ML libraries, and one or more HE libraries. For each client device of the multiple client devices, the encrypted data is homomorphically encrypted by the client device based on the public key. The method 500 includes aggregating the encrypted data associated with each of the one or more client devices to generate aggregated data, at 504. For example, the aggregated data may include or correspond to the aggregated encrypted client data 114 of FIG. 1.

The method 500 includes constructing an ML model based on the aggregated data, at 506. The ML model is configured to output a predicted diagnosis based on input data. For example, the ML model may include or correspond to the aggregated ML model parameter set 116 of FIG. 1. The method 500 includes initiating deployment of the ML model to at least one of the one or more client devices, an endpoint node, or a combination thereof, at 508. For example, the ML model may be deployed to client devices, an end node, or both, as further described above with reference to FIGS. 1-4.

In some implementations, the encrypted data corresponds to historical medical data, the ML model is configured to output a diagnosis of a patient based on medical data represented by the input data, and the medical data, the historical medical data, or both, include patient characteristic data, symptom data, measurement data, medical imaging data, medical procedure data, or a combination thereof. Additionally or alternatively, the executable file package may include or correspond to a Docker container.

In some implementations, the encrypted data includes, for each client device of the one or more client devices, encrypted client data associated with a respective client device, and constructing the ML model includes providing the aggregated data as training data to the ML model to train the ML model. For example, with reference to FIG. 1, the server 102 may generate the aggregated encrypted client data 114 based on encrypted data from each of the client devices 140 and 150. Additionally or alternatively, the one or more client devices may include multiple client devices, and the encrypted data received from the multiple client devices has a common data format. For example, the client devices 140 and 150 may perform pre-processing operations on the respective client data prior to encryption, thereby generating encrypted client data having a common format.

In some implementations, deploying the ML model to the endpoint node configures the endpoint node to receive an encrypted diagnosis request from a client device and to transmit, to the client device, an encrypted predicted diagnosis based on the encrypted diagnosis request. For example, the encrypted diagnosis request may include or correspond to the encrypted request 180 of FIG. 1, and the encrypted predicted diagnosis may include or correspond to the encrypted prediction 182 of FIG. 1. Additionally or alternatively, the method 500 may further include, based on execution of the executable file package, homomorphically encrypting, for each of the at least one of the one or more client devices, an ML model parameter set that corresponds to the ML model based on the public key. Deployment of the ML model to at least one of the one or more client devices may include providing the respective encrypted ML model parameter set to each of the at least one of the one or more client devices, as further described with reference to FIG. 2. Additionally or alternatively, the method 500 may further include, based on execution of the executable file package, applying one or more weights to the encrypted data prior to aggregation of the encrypted data. The one or more weights may be based on processing resources available at a respective client device, an amount of client data associated with the respective client device, a priority associated with the respective client device, or a combination thereof. For example, the one or more weights may include or correspond to the weights 118 of FIG. 1.

In some implementations, the method 500 may also include, based on execution of the executable file package, generating a common public key and multiple secret keys and providing the common public key and one of the secret keys to each of the multiple client devices. A threshold number of secret keys may enable decryption of information encrypted based on the common public key. For example, the common public key may include or correspond to the common public key 348 of FIGS. 3A and 3B, and the secret key may include or correspond to the first secret key 316, the second secret key 326, or the Nth secret key 336 of FIGS. 3A and 3B. In some such implementations, the method 500 may further include, based on execution of the executable file package, encrypting the ML model based on the common public key to generate an encrypted ML model parameter set. Deployment of the ML model to at least one of the one or more client devices may include providing the encrypted ML model parameter set to the one or more client devices. For example, with reference to FIG. 3A, the diagnosis prediction model parameter set 345 may be encrypted by the server 340 using the common public key 348 and provided to the clients 310, 320, and 330. In some such implementations, the method 500 may also include, based on execution of the executable file package, receiving, from each client device of a subset of the one or more client devices, a partially decrypted ML model. The subset may include a quantity of client devices that satisfies the threshold number, and, for each client device of the subset, the partially decrypted ML model may be partially decrypted by the client device based on a secret key associated with the client device. For example, the partially decrypted ML models may include or correspond to the first partially decrypted parameter set 318 and the Nth partially decrypted parameter set 338 of FIG. 3B. In such implementations, the method 500 further includes aggregating the partially decrypted ML models to generate a decrypted ML model and initiating deployment of the decrypted ML model to the one or more client devices. For example, the decrypted ML model may include or correspond to the diagnosis prediction model parameter set 349 of FIG. 3B.

As described above, the method 500 supports training of ML models that preserves privacy of client data used to train the ML models. For example, the method 500 supports training, at a server, of an ML model based on encrypted client data (that is not capable of decryption by the server or other clients) to construct a global diagnosis prediction model that is more robust than individual client-specific diagnosis prediction models, or to construct client-specific individual ML models without exposing the client data to the server or a cloud service provider. Additionally, by using distributed executable file package(s), the method 500 may enable existing cloud service providers that only support individual client ML model training based on non-encrypted data to also support ML model training in a privacy-preserving manner. Thus, the method 500 provides a scalable, privacy-preserving method for machine learning that preserves privacy in an untrusted environment.

Figure 6:
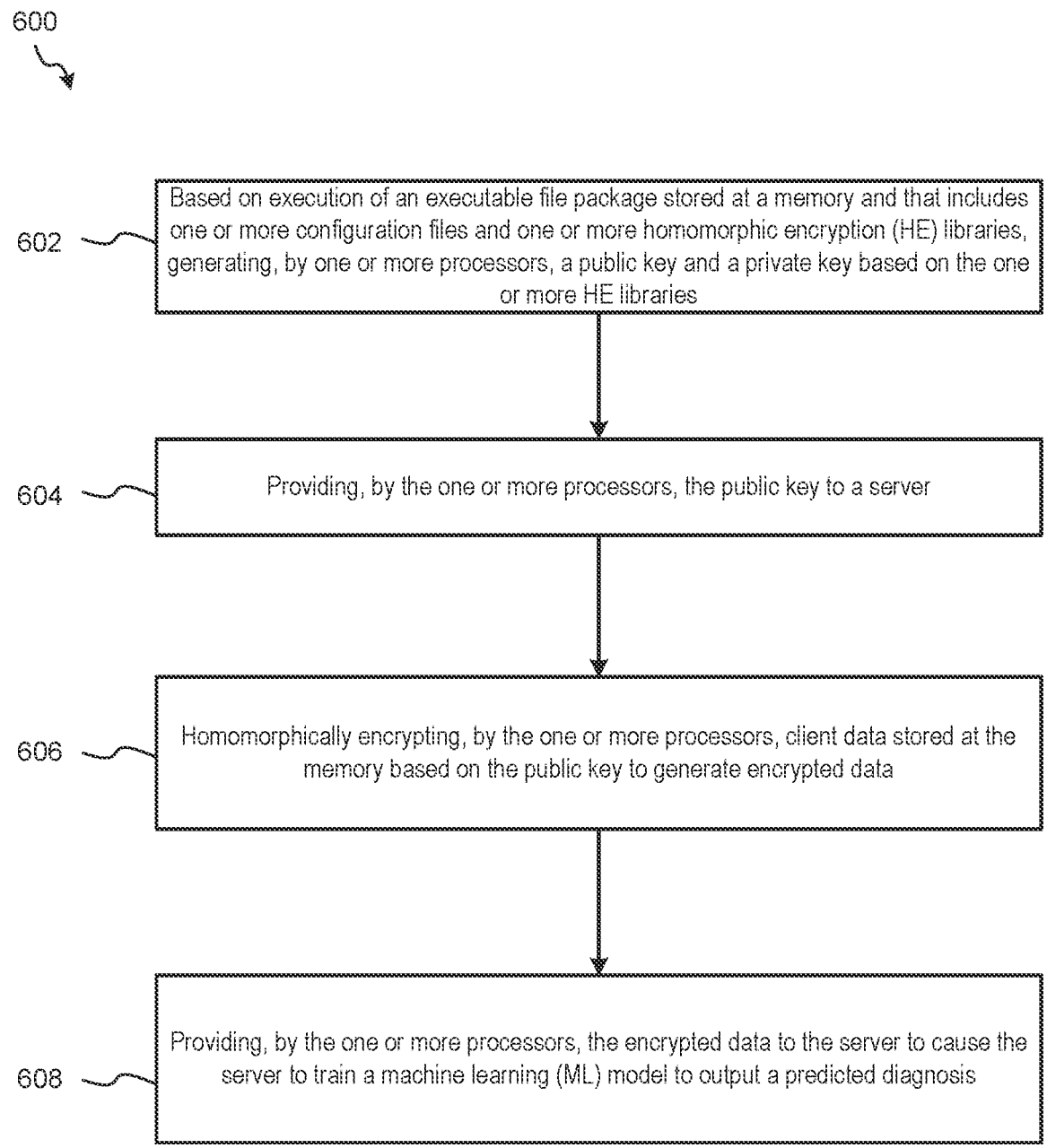
FIG. 6 is a flow diagram illustrating another example of a method for training ML models based on encrypted data using distributed executable file packages according to one or more aspects.

Referring to FIG. 6, a flow diagram of another example of a method for training ML models based on encrypted data using distributed executable file package according to one or more aspects is shown as a method 600. In some implementations, the operations of the method 600 may be stored as instructions that, when executed by one or more processors (e.g., the one or more processors of a computing device), cause the one or more processors to perform the operations of the method 600. In some implementations, the method 600 may be performed by a computing device, such as the first client device 140 or the Nth client device 150 of FIG. 1 (e.g., a computing device of a client of a cloud-based ML services provider), the first client 210, the second client 220, or the Nth client 230 of FIG. 2, the first client 310, the second client 320, or the Nth client 330 of FIG. 3, the first client 410, the second client 420, or the Nth client 430 of FIG. 4, or a combination thereof.

The method 600 includes executing an executable file package stored at a memory to generate a public key and a private key based on one or more HE libraries, at 602. For example, the executable file package may include or correspond to the executable file package 144 of FIG. 1, and the public key may include or correspond to the first public key 146 or the Nth public key 156 of FIG. 1. The executable file package includes one or more configuration files and one or more HE libraries. The method 600 includes providing the public key to a server, at 604. For example, the server may include or correspond to the server 102 of FIG. 1.

The method 600 includes homomorphically encrypting client data stored at the memory based on the public key to generate encrypted data, at 606. For example, the client data may include or correspond to the first client data 142 or the Nth client data 152 of FIG. 1. The method 600 includes providing the encrypted data to a server to cause the server to train an ML model to output a predicted diagnosis, at 608. For example, the encrypted data may include or correspond to the first encrypted data 170 or the Nth encrypted data 172 of FIG. 1.

In some implementations, providing the encrypted data to the server may cause the server to train the ML model based on encrypted data from multiple client devices. For example, with reference to FIG. 1, the server 102 may train an ML model (e.g., a global ML model) based on the aggregated encrypted client data 114, or the server 102 may train client-specific ML models based on individual client data.

In some implementations, the method 600 may also include, based on execution of the executable file package, receiving an encrypted diagnosis prediction model parameter set from the server, decrypting the encrypted diagnosis prediction model parameter set based on the private key to generate a diagnosis prediction model, homomorphically encrypting request data based on the public key, providing the encrypted request data as input data to the diagnosis prediction model to cause the diagnosis prediction model to output an encrypted predicted diagnosis, and decrypting the encrypted predicted diagnosis based on the private key to obtain a predicted diagnosis associated with the request data, as further described with reference to FIG. 2. Additionally or alternatively, the method 600 may further include, based on execution of the executable file package, homomorphically encrypting request data based on the public key, providing the encrypted request data to an endpoint node that implements a diagnosis prediction model, receiving an encrypted predicted diagnosis from the endpoint node, and decrypting the encrypted predicted diagnosis based on the private key to obtain a predicted diagnosis associated with the request data. For example, the encrypted request data may include or correspond to the encrypted request 180 of FIG. 1, and the encrypted predicted diagnosis may include or correspond to the encrypted prediction 182 of FIG. 1.

In some implementations, the method 600 may also include, based on execution of the executable file package, receiving an individual secret key from the server, receiving an encrypted ML model parameter set from the server, partially decrypting the encrypted ML model parameter set based on the individual secret key to generate a partially decrypted ML model parameter set, and providing the partially decrypted ML model parameter set to the server. The server may be configured to deploy an non-encrypted ML model based on receipt of partial decrypted ML models from a threshold number of client devices. For example, the individual secret key may include or correspond to the first secret key 316, the second secret key 326, or the Nth secret key 336 of FIGS. 3A and 3B, the partially decrypted ML model parameter set may include or correspond to the first partially decrypted parameter set 318 or the Nth partially decrypted parameter set 338 of FIG. 3B, and the non-encrypted ML model may include or correspond to the diagnosis prediction model parameter set 349 of FIG. 3B. Additionally or alternatively, the executable file package may further include one or more pre-processing files or libraries, and the method 600 may also include, based on execution of the executable file package, selectively performing one or more pre-processing operations on the client data prior to homomorphically encrypting the client data, as further described with reference to FIGS. 1-2. The one or more pre-processing operations may be configured to eliminate duplicate or null features, add one or more missing feature values, convert the client data to a common format, or a combination thereof.

As described above, the method 600 supports training of ML models that preserves privacy of client data used to train the ML models. For example, the method 600 supports, at a client device, encryption of client specific data to be used to train an ML model at a server or training of an individual ML model for aggregation of client-trained ML models at the server to construct a global diagnosis prediction model that is more robust than individual client-specific diagnosis prediction models. Additionally, by using distributed executable file package(s), the method 600 may enable clients that do not employ computer programmers or data scientists to participate in the training of ML models, including encryption, pre-processing, and ML training operations. Thus, the method 600 provides a scalable, privacy-preserving method for machine learning that preserves privacy in an untrusted environment.

It is noted that other types of devices and functionality may be provided according to aspects of the present disclosure and discussion of specific devices and functionality herein have been provided for purposes of illustration, rather than by way of limitation. It is noted that the operations of the method 500 of FIG. 5 and the method 600 of FIG. 6 may be performed in any order, or that operations of one method may be performed during performance of another method, such as the method 500 of FIG. 5 including one or more operations of the method 600 of FIG. 6. It is also noted that the method 500 of FIG. 5 and the method 600 of FIG. 6 may also include other functionality or operations consistent with the description of the operations of the system 100 of FIG. 1, the system 200 of FIG. 2, the system 300 of FIGS. 3A-B, the system 400 of FIG. 4, or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6) include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for training machine learning models, the method comprising:
    based on execution, by one or more processors, of an executable file package stored at a memory:
        receiving, by the one or more processors from each of one or more client devices, encrypted data and a public key,
            wherein the executable file package includes one or more configuration files, one or more machine learning (ML) libraries, and one or more homomorphic encryption (HE) libraries, and
            wherein, for each client device of the one or more client devices, the encrypted data is homomorphically encrypted by the client device based on the public key;
        applying, based on execution of the executable file package, one or more weights to the encrypted data prior to aggregating the encrypted data, wherein the one or more weights are based on processing resources available at a respective client device, an amount of client data associated with the respective client device, or a combination thereof,
        aggregating, by the one or more processors, the encrypted data associated with each of the one or more client devices to generate aggregated data;
        constructing, by the one or more processors, an ML model based on the aggregated data, the ML model configured to output a predicted diagnosis based on input data; and
        initiating, by the one or more processors, deployment of the ML model to at least one of the one or more client devices, an endpoint node, or a combination thereof.

2. The method of claim 1, wherein:
    the encrypted data corresponds to historical medical data;
    the ML model is configured to output a diagnosis of a patient based on medical data represented by the input data; and
    the medical data, the historical medical data, or both, include patient characteristic data, symptom data, measurement data, medical imaging data, medical procedure data, or a combination thereof.

3. The method of claim 1, wherein the executable file package comprises a Docker container.

4. The method of claim 1, wherein:
    the encrypted data comprises, for each client device of the one or more client devices, encrypted client data associated with a respective client device; and
    constructing the ML model comprises providing the aggregated data as training data to the ML model to train the ML model.

5. The method of claim 1, wherein:
the one or more client devices comprises multiple client devices; and
the encrypted data received from the multiple client devices has a common data format.

6. The method of claim 1, wherein deploying the ML model to the endpoint node configures the endpoint node to receive an encrypted diagnosis request from a client device and to transmit, to the client device, an encrypted predicted diagnosis based on the encrypted diagnosis request.

7. A system for training machine learning models, the system comprising:
a memory configured to store an executable file package, wherein the executable file package includes one or more configuration files, one or more machine learning (ML) libraries, and one or more homomorphic encryption (HE) libraries; and
one or more processors communicatively coupled to the memory, the one or more processors configured to execute the executable file package to:
receive, from each of one or more client devices, encrypted data and a public key,
wherein, for each client device of the one or more client devices, the encrypted data is homomorphically encrypted based on the public key;
apply, based on execution of the executable file package, one or more weights to the encrypted data prior to aggregating the encrypted data, wherein the one or more weights are based on processing resources available at a respective client device, an amount of client data associated with the respective client device, or a combination thereof;
aggregate the encrypted data associated with each of the one or more client devices to generate aggregated data;
construct an ML model based on the aggregated data, the ML model configured to output a predicted diagnosis based on input data; and
initiate deployment of the ML model to at least one of the one or more client devices, an endpoint node, or a combination thereof.

8. The system of claim 7, wherein execution of the executable file package further causes the one or more processors to:
homomorphically encrypt, for each of the at least one of the one or more client devices, an ML model parameter set that corresponds to the ML model based on the public key,
wherein deployment of the ML model to at least one of the one or more client devices comprises providing the respective encrypted ML model parameter set to each of the at least one of the one or more client devices.

9. The system of claim 7, wherein execution of the executable file package further causes the one or more processors to:
generate a common public key and multiple secret keys,
wherein a threshold number of secret keys enables decryption of information encrypted based on the common public key; and
provide the common public key and one of the secret keys to each of the one or more client devices.

10. The system of claim 9, wherein execution of the executable file package further causes the one or more processors to:
encrypt the ML model based on the common public key to generate an encrypted ML model parameter set,
wherein deployment of the ML model to at least one of the one or more client devices comprises providing the encrypted ML model parameter set to the one or more client devices.

11. The system of claim 10, wherein execution of the executable file package further causes the one or more processors to:
receive, from each client device of a subset of the one or more client devices, a partially decrypted ML model,
wherein the subset includes a quantity of client devices that satisfies the threshold number, and
wherein, for each client device of the subset, the partially decrypted ML model is partially decrypted by the client device based on a secret key associated with the client device;
aggregate the partially decrypted ML models to generate a decrypted ML model; and
initiate deployment of the decrypted ML model to the one or more client devices.

* * * * *